US012133283B2

(12) United States Patent
Jiang et al.

(10) Patent No.: US 12,133,283 B2
(45) Date of Patent: Oct. 29, 2024

(54) DATA PROCESSING METHOD, BLUETOOTH MODULE, ELECTRONIC DEVICE, AND READABLE STORAGE MEDIUM

(71) Applicant: Huawei Technologies Co., Ltd., Shenzhen (CN)

(72) Inventors: Zhongyin Jiang, Nanjing (CN); Keyang Yin, Nanjing (CN); Le Chen, Nanjing (CN); Li Li, Nanjing (CN); Bo Ling, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 17/761,894

(22) PCT Filed: Sep. 14, 2020

(86) PCT No.: PCT/CN2020/114990
§ 371 (c)(1),
(2) Date: Mar. 18, 2022

(87) PCT Pub. No.: WO2021/052282
PCT Pub. Date: Mar. 25, 2021

(65) Prior Publication Data
US 2022/0394454 A1 Dec. 8, 2022

(30) Foreign Application Priority Data
Sep. 18, 2019 (CN) .......................... 201910883708.9

(51) Int. Cl.
*H04W 8/00* (2009.01)
*G06F 3/16* (2006.01)
*H04W 4/06* (2009.01)
*H04W 4/80* (2018.01)
*G10L 15/26* (2006.01)

(52) U.S. Cl.
CPC .............. *H04W 8/005* (2013.01); *G06F 3/16* (2013.01); *H04W 4/06* (2013.01); *H04W 4/80* (2018.02); *G10L 15/26* (2013.01)

(58) Field of Classification Search
CPC ......... H04W 8/005; H04W 4/80; H04W 4/06; G06F 3/16; G10L 15/26
USPC ........................................................ 455/3.06
See application file for complete search history.

(56) References Cited

U.S. PATENT DOCUMENTS 9,900,657 B2 * 2/2018 Hong ................. H04N 21/4782
11,032,686 B2 * 6/2021 Montemurro ..... H04W 36/0061
(Continued)

FOREIGN PATENT DOCUMENTS

| CN | 104333401 A | 2/2015 |
| CN | 106469040 A | 3/2017 |

(Continued)

*Primary Examiner* — April G Gonzales
(74) *Attorney, Agent, or Firm* — Conley Rose, P.C.

(57) ABSTRACT

A data processing method includes, when receiving a BLUETOOTH scanning enabling indication of a first application, a first device that receives broadcast data from a second device, sends a scanning request to the second device, and receives a scanning response. Accordingly, when the broadcast data is a data packet of a specified type, the broadcast data is reported to the first application, and the scanning response is discarded.

20 Claims, 23 Drawing Sheets

(56) References Cited

U.S. PATENT DOCUMENTS

| | | | | |
|---|---|---|---|---|
| 2014/0362728 | A1* | 12/2014 | Krochmal | H04W 12/033 |
| | | | | 370/254 |
| 2015/0026580 | A1* | 1/2015 | Kang | H04W 12/04 |
| | | | | 455/39 |
| 2015/0263886 | A1* | 9/2015 | Wang | H04L 41/12 |
| | | | | 370/254 |
| 2017/0223579 | A1* | 8/2017 | Lee | H04W 8/005 |
| 2017/0272405 | A1* | 9/2017 | Kerai | H04W 12/06 |
| 2017/0272906 | A1* | 9/2017 | Kerai | H04W 12/06 |
| 2018/0247645 | A1* | 8/2018 | Li | G06F 3/167 |
| 2018/0255422 | A1* | 9/2018 | Montemurro | H04W 36/302 |
| 2019/0012141 | A1* | 1/2019 | Piersol | G10L 15/30 |
| 2019/0241049 | A1* | 8/2019 | Yu | B60J 3/0239 |
| 2019/0253859 | A1* | 8/2019 | Montemurro | H04W 76/15 |
| 2019/0341049 | A1 | 11/2019 | Cheng et al. | |
| 2020/0053831 | A1* | 2/2020 | Park | H04W 80/02 |
| 2022/0394454 | A1* | 12/2022 | Jiang | H04W 8/005 |
| 2023/0122058 | A1* | 4/2023 | Orr | G06F 3/013 |
| | | | | 345/156 |

FOREIGN PATENT DOCUMENTS

| | | |
|---|---|---|
| CN | 108564947 A | 9/2018 |
| CN | 108735217 A | 11/2018 |
| CN | 108831448 A | 11/2018 |
| CN | 109041216 A | 12/2018 |
| CN | 109391528 A | 2/2019 |
| CN | 109831746 A | 5/2019 |
| CN | 110784830 A | 2/2020 |
| CN | 111369988 A | 7/2020 |

* cited by examiner

DATA PROCESSING METHOD, BLUETOOTH MODULE, ELECTRONIC DEVICE, AND READABLE STORAGE MEDIUM

CROSS-REFERENCE TO RELATED APPLICATIONS

This is a U.S. National Stage of International Patent Application No. PCT/CN2020/114990 filed on Sep. 14, 2020, which claims priority to Chinese Patent Application No. 201910883708.9 filed on Sep. 18 2019. Both of the aforementioned applications are hereby incorporated by reference in their entireties.

TECHNICAL FIELD

This application relates to the field of computers, and in particular, to a data processing method, a Bluetooth module, an electronic device, and a readable storage medium.

BACKGROUND

Currently, over 1 billion smart devices provide voice assistant services for users, such as Google Assistant (a Google assistant), Siri (a voice assistant developed by Apple), Cortana (a voice assistant developed by Lenovo), Xiao Ai Lite (a voice assistant service developed by Xiaomi), and Huawei Xiaoyi (a voice assistant developed by Huawei). The smart device may be woken up by a wakeup word sent by the user. For example, if the user utters a voice "Xiaoyi, Xiaoyi", a smart device equipped with Huawei Xiaoyi may be woken up. After being woken up, the smart device may receive a voice command of the user, and execute a function corresponding to the voice command. For example, the smart device turns on a camera, plays a video, or opens an application (Application, APP) according to a collected user voice.

When there are a plurality of smart devices around the user, if at least two smart devices have a same wakeup word, the at least two smart devices are woken up by the same wakeup word. This causes trouble to the user, and results in poor voice service experience. For example, FIG. 1 shows the following case: In an environment in which the user is located, there are four smart devices: a mobile phone 100, a smart television 200, a smart band 300, and a smart speaker 400. These smart devices each are equipped with a voice assistant service, and can be woken up by a voice uttered by the user. For example, the user sends a wakeup word "Xiaoyi, Xiaoyi", and all the four smart devices can receive the wakeup word. In this way, the mobile phone 100, the smart television 200, and the smart speaker 400 can all respond to the wakeup word. Consequently, a subsequent voice interaction environment is complex, and the user further needs to turn off some of the electronic devices. In this case, the smart device may perform data synchronization with another smart device by using a Bluetooth module. However, in a Bluetooth scanning process, a packet loss often occurs, resulting in a slow voice response speed or a response error, and poor voice control experience.

SUMMARY

This application provides a data processing method, a Bluetooth module, an electronic device, and a readable storage medium, to reduce a packet loss rate in a Bluetooth scanning process and improve voice control experience.

According to a first aspect, this application provides a data processing method. In this embodiment of this application, when receiving a Bluetooth scanning enabling indication of a first application, a first device receives second broadcast data sent by a second device, sends a scanning request to the second device, and receives a scanning response. Therefore, when the second broadcast data is a data packet of a specified type, the second broadcast data is reported to the first application, and the scanning response is discarded. This avoids a problem that the first device cannot receive broadcast data or cannot receive the scanning response, and then the broadcast data and the scanning response cannot be combined and reported, and can reduce a packet loss rate to some extent. Therefore, when the data packet of the specified type is a collaboration data packet, it also helps reduce duration of a collaborative response, increase a voice response speed of the first device, and improve voice control experience of a user.

In addition, in this application, when the second broadcast data is not the data packet of the specified type, the second broadcast data and the scanning response are combined to obtain combined data, and the combined data is reported to the first application. In this way, different scanning means are adopted based on a type of the data packet, which is relatively flexible.

In a specific application scenario of this application, when the first application is a voice assistant application, the Bluetooth scanning enabling indication is sent after the first application collects a sound signal. As shown in FIG. 6 or FIG. 7, when a smart device collects a sound signal and needs to perform collaborative response, a Bluetooth module is enabled to perform scanning.

In a collaborative response scenario, when the second broadcast data is the data packet of the specified type, the second broadcast data carries collaboration information of the second device. In this way, the first device may obtain the collaboration information of the second device. In addition, in addition to obtaining collaboration information of another smart device, for example, the second device, the first device may further broadcast collaboration information of the first device to the outside. Specifically, the first device may further broadcast first broadcast data when the Bluetooth scanning enabling indication of the first application is received, where the first broadcast data carries the collaboration information of the first device.

In this embodiment of this application, the collaboration information is used to determine a response device of the sound signal. The collaboration information may include but is not limited to at least one of a device type, a latest Bluetooth wakeup moment, a latest Bluetooth response moment, and sound intensity of the sound signal. For any wakeup word, collaboration information of a response device of the wakeup word needs to meet a preset response rule. For example, it is met that sound intensity of a sound signal is highest. For another example, it is met that a total score of the foregoing pieces of collaboration information is highest.

In a specific embodiment, as shown in FIG. 6, the Bluetooth scanning enabling indication is sent after the first application collects the sound signal and when it is recognized that the sound signal is a wakeup word of the first device. A collaborative response process and a voice recognition process are implemented in a serial manner.

In another embodiment, as shown in FIG. 7, the Bluetooth scanning enabling indication is sent after the first application collects the sound signal and before a voice recognition result is obtained. In this case, a collaborative response process overlaps with a voice recognition process, and the collaborative response process and the voice recognition process may be considered as being implemented in a "parallel" manner.

When the collaborative response is performed in a manner shown in FIG. 7, when broadcasting the collaboration information of the first device, the first device may not determine whether a currently collected sound signal is the wakeup word of the first device. In this case, when the collaboration information of the first device meets the preset response rule, but it is recognized that the sound signal is not the wakeup word of the first device, the first device may broadcast third broadcast data, where the third broadcast data is used to indicate that the sound signal is not the wakeup word of the first device. Therefore, another smart device may additionally determine a response device of the sound signal.

In this embodiment of this application, a scanning environment of the first application may be further preconfigured. Specifically, when it is detected that a Bluetooth option in the first device is turned on, a first filter and a first scanning parameter are configured for the first application. In this way, when the Bluetooth scanning enabling indication of the first application is received, scanning may be performed directly, without spending time to configure a filter and a scanning parameter, which reduces scanning duration, and helps increase a scanning response speed.

In this case, when a Bluetooth scanning disabling indication sent by the first application is received, data sending and receiving is stopped, and the first filter and the first scanning parameter are retained. In this case, the first filter is not released, but is retained. The first scanning parameter is also retained. Therefore, if the first application needs to enable new scanning, the first application may directly start a scanning process without configuring a scanning environment.

In a possible embodiment, on the premise that the first filter and the first scanning parameter are configured in advance, if the first device receives a Bluetooth scanning enabling indication of a second application, the first device may configure a second filter for the second application, and modify the first scanning parameter to a second scanning parameter. In this case, the first device has two filters, and a scanning parameter used by the first device changes from the first scanning parameter to the second scanning parameter. In this case, the second scanning parameter may be further stored in another location, to restore the second scanning parameter after scanning of the second application is completed. After the foregoing configuration, the first device may scan the second application by using the second filter and the second scanning parameter.

In this case, when receiving a scanning disabling indication sent by the second application, the first device stops sending and receiving data, releases the second filter, and restores the second scanning parameter to the first scanning parameter. In this case, the first device has the first filter, a scanning parameter used by the Bluetooth module is restored to the first scanning parameter, and the second scanning parameter is deleted or discarded.

In another possible case, when the first device has reported a scanning result of the second application, but does not receive a scanning disabling indication sent by the second application, the first device further receives the Bluetooth scanning enabling indication of the first application. In this case, the first device may terminate or pause scanning of the second application, and configure the first scanning parameter for the first application. In this way, the first device may scan the first application by using the first filter and the first scanning parameter.

In this embodiment of this application, a first duty cycle is used for the first scanning parameter, a second duty cycle is used for the second scanning parameter, and the first duty cycle is greater than the second duty cycle.

In this embodiment of this application, when the first application invokes a Bluetooth scanning broadcast interface, the Bluetooth scanning enabling indication sent by the first application is received.

According to a second aspect, this application provides a Bluetooth module, including: one or more processors; one or more memories; and one or more computer programs, where the one or more computer programs are stored in the one or more memories, the one or more computer programs include instructions, and when the instructions are executed by the electronic device, the electronic device is enabled to perform the method according to any embodiment in the first aspect.

According to a third aspect, this application provides an electronic device, including: one or more processors; one or more memories; one or more Bluetooth modules; and one or more computer programs, where the one or more computer programs are stored in the one or more memories, the one or more computer programs include instructions, and when the instructions are executed by the electronic device, the electronic device is enabled to perform the method according to any embodiment in the first aspect.

According to a fourth aspect, an embodiment of this application further provides a computer storage medium, including computer instructions. When the computer instructions are run on an electronic device, the electronic device is enabled to perform the method according to any one of the foregoing implementations.

According to a fifth aspect, an embodiment of this application further provides a computer program product. When the computer program product is run on an electronic device, the electronic device is enabled to perform the method according to any one of the foregoing implementations.

In conclusion, the data processing method, the electronic device, and the readable storage medium in this application can reduce a packet loss rate in a Bluetooth scanning process, and help improve data synchronization efficiency to some extent, thereby improving a response speed of a smart device, and helping improve voice control experience.

DESCRIPTION OF EMBODIMENTS

The following describes the technical solutions in the embodiments of this application with reference to the accompanying drawings in the embodiments of this application. In the descriptions of the embodiments of this application, unless otherwise specified, "/" means "or". For example, A/B may represent A or B. In this specification, "and/or" describes only an association between associated objects and represents that three relationships may exist. For example, A and/or B may represent the following three cases: Only A exists, both A and B exist, and only B exists. In addition, in the descriptions of the embodiments of this application, "a plurality of" means two or more.

The technical solutions provided in the embodiments of this application may be applied to any electronic device that can respond to a voice command of a user, for example, a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), and a smart home device. This is not limited in the embodiments of this application.

Figure 2:
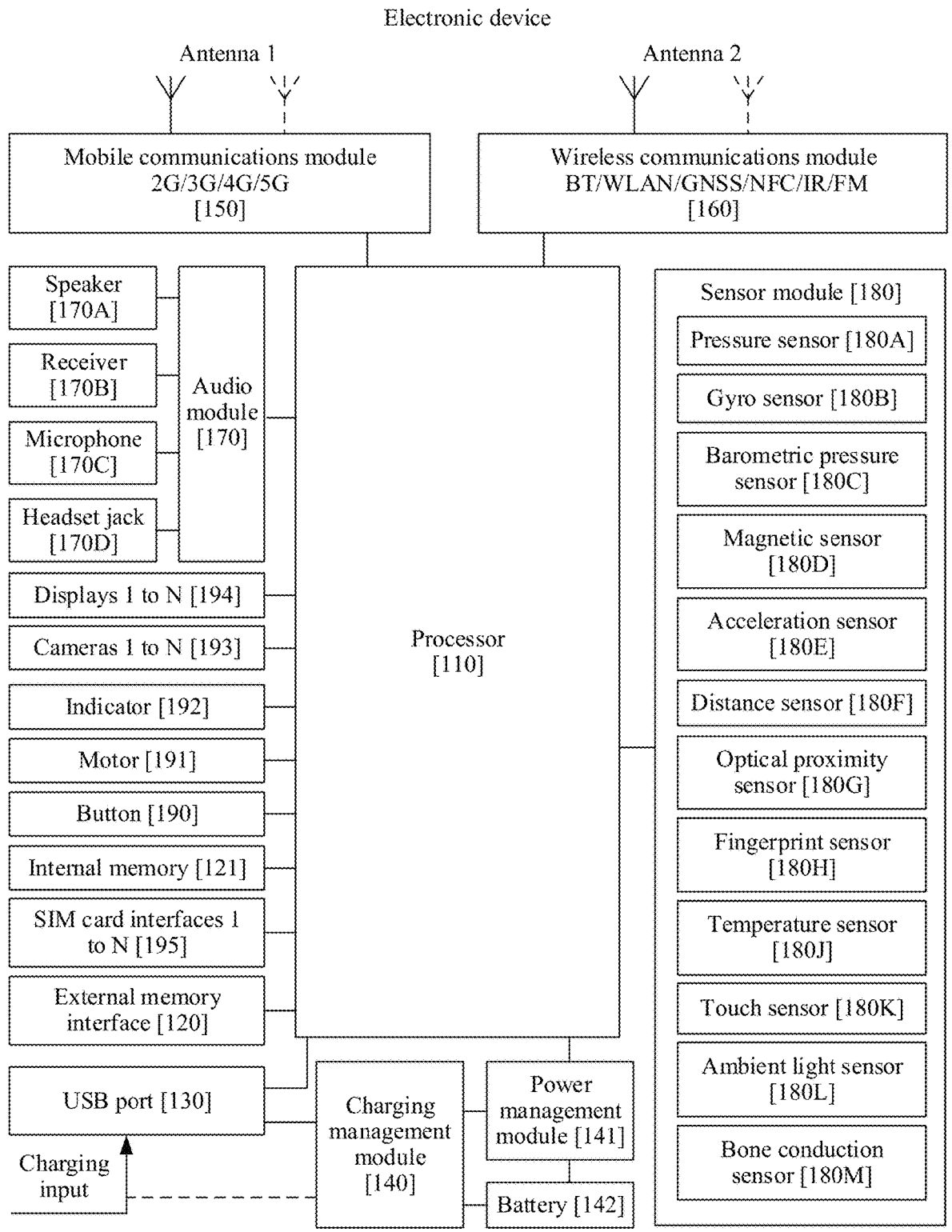
FIG. 2 is a schematic diagram of a structure of an electronic device according to an embodiment of this application.

For example, FIG. 2 is a schematic diagram of a structure of an electronic device.

The electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor 180, a button 190, a motor 191, an indicator 192, a camera 193, a display 194, a subscriber identification module (subscriber identification module, SIM) card interface 195, and the like. It may be understood that the structure illustrated in this embodiment does not constitute a specific limitation on the electronic device. In some other embodiments of this application, the electronic device may include more or fewer components than those shown in the figure, or some components may be combined, or some components may be split, or there may be a different component layout. For example, when the electronic device is a smart television, one or more of the SIM card interface 195, the camera 193, the button 190, the receiver 170B, the microphone 170C, the headset interface 170D, the sensor module 180, the charging management module 140, and the battery 142 do not need to be disposed in the smart television. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device may also include one or more processors 110. The controller may be a nerve center and a command center of the electronic device. The controller may generate an operation control signal based on command operation code and a time sequence signal, to complete control of command fetching and command execution. A memory may be further disposed in the processor 110, and is configured to store commands and data. In some embodiments, the memory in the processor 110 is a cache. The memory may store commands or data just used or cyclically used by the processor 110. If the processor 110 needs to use the commands or the data again, the processor 110 may directly invoke the commands or the data from the memory. This avoids repeated access and reduces waiting time of the processor 110, thereby improving efficiency of the electronic device.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like. The USB port 130 is an interface that conforms to a USB standard specification, and may be specifically a mini USB port, a micro USB port, a USB Type-C port, or the like. The USB port 130 may be configured to connect to a charger to charge the electronic device, or may be configured to transmit data between the electronic device and a peripheral device, or may be configured to connect to a headset and play audio through the headset.

It may be understood that an interface connection relationship between the modules that is shown in this embodiment of the present invention is merely an example for description, and does not constitute a limitation on the structure of the electronic device. In some other embodiments of this application, the electronic device may alternatively use an interface connection manner different from that in the foregoing embodiment, or a combination of a plurality of interface connection manners.

The charging management module 140 is configured to receive charging input from the charger. The charger may be a wireless charger or a wired charger. In some embodiments of wired charging, the charging management module 140 may receive charging input of the wired charger through the USB port 130. In some embodiments of wireless charging, the charging management module 140 may receive wireless charging input through a wireless charging coil of the electronic device. The charging management module 140 may further supply power to the electronic device by using the power management module 141 while charging the battery 142.

The power management module 141 is configured to connect the battery 142 and the charging management module 140 to the processor 110. The power management module 141 receives input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna of the electronic device may be configured to cover one or more communication frequency bands. Different antennas may be further multiplexed, to increase antenna utilization. For example, the antenna 1 may be multiplexed as a diversity antenna in a wireless local area network. In some other embodiments, the antenna may be used in combination with a tuning switch.

The mobile communications module 150 may provide a solution that is for wireless communication including 2G/3G/4G/5G and the like and that is applied to the electronic device. The mobile communications module 150 may include at least one filter, a switch, a power amplifier, a low noise amplifier, and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits an obtained signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes a wireless local area network (wireless local area network, WLAN), Bluetooth, a global navigation satellite system (global navigation satellite system, GNSS), frequency modulation (frequency modulation, FM), NFC, an infrared (infrared, IR) technology, or the like and that is applied to the electronic device. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device are coupled, and the antenna 2 and the wireless communications module 160 in the electronic device are coupled, so that the electronic device can communicate with a network and another device through a wireless communications technology. The wireless communications technology may include GSM, GPRS, CDMA, WCDMA, TD-SCDMA, LTE, GNSS, WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute commands to generate or change display information.

The display 194 is configured to display an image, a video, or the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the electronic device may include one or N displays 194, where N is a positive integer greater than 1.

The electronic device may implement a photographing function through the ISP, one or more cameras 193, the video codec, the GPU, one or more displays 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal of a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. Therefore, the electronic device 100 can play or record videos of a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device, for example, image recognition, facial recognition, speech recognition, and text understanding, can be implemented through the NPU.

The external memory interface 120 may be configured to connect to an external memory card, for example, a micro SD card, to extend a storage capability of the electronic device. The external storage card communicates with the processor 110 through the external memory interface 120, to implement a data storage function. For example, data files such as music, photos, and videos are stored in the external storage card.

The internal memory 121 may be configured to store one or more computer programs, and the one or more computer programs include commands. The processor 110 may run the commands stored in the internal memory 121, so that the electronic device performs a voice switching method provided in some embodiments of this application, various function applications, data processing, and the like. The internal memory 121 may include a program storage area and a data storage area. The program storage area may store an operating system. The program storage area may further store one or more applications (for example, Gallery and Contacts), and the like. The data storage area may store data (for example, Photos and Contacts) created during use of the electronic device. In addition, the internal memory 121 may include a high-speed random access memory, and may further include a nonvolatile memory, for example, at least one magnetic disk storage device, a flash memory device, or a universal flash storage (universal flash storage, UFS). In some embodiments, the processor 110 may run the commands stored in the internal memory 121 and/or commands stored in the memory disposed in the processor 110, to enable the electronic device to perform the voice switching method provided in the embodiments of this application, various function applications, and data processing.

The electronic device may implement audio functions, for example, music playing and recording, by using the audio module 170, the speaker 170A, the receiver 170B, the microphone 170C, the headset jack 170D, the application processor, and the like, for example, implement a music playback function and a recording function. The audio module 170 is configured to convert digital audio information into analog audio signal output, and is also configured to convert analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device may be used to listen to music or answer a hands-free call by using the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mike" or a "mic", is configured to convert a sound signal into an electrical signal. When making a call or sending speech information, a user may place the mouth of the user near the microphone 170C to utter a voice, to input a sound signal to the microphone 170C. At least one microphone 170C may be disposed in the electronic device. In some other embodiments, two microphones 170C may be disposed in the electronic device, to collect a sound signal and further implement a noise reduction function. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The sensor 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, a capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch position based on a detection signal of the pressure sensor 180A. In some embodiments, touch operations that are performed at a same touch location but have different touch operation intensity may correspond to different operation commands. For example, when a touch operation whose touch operation intensity is less than a first pressure threshold is performed on an SMS message application icon, a command for viewing an SMS message is executed. When a touch operation whose touch operation intensity is greater than or equal to the first pressure threshold is performed on the SMS message application icon, a command for creating an SMS message is executed.

The gyro sensor 180B may be configured to determine a motion posture of the electronic device. In some embodiments, angular velocities of the electronic device around three axes (namely, axes x, y, and z) may be determined by using the gyro sensor 180B. The gyro sensor 180B may be configured to implement image stabilization during photographing. For example, when a shutter is pressed, the gyroscope sensor 180B detects a jitter angle of the electronic device, calculates, based on the angle, a distance for which a lens module needs to compensate, and enables the lens to offset jitter of the electronic device through reverse motion, to implement image stabilization. The gyro sensor 180B may be further used in a navigation scenario, a motion-sensing game scenario, and the like.

The acceleration sensor 180E may detect magnitude of accelerations of the electronic device in various directions (usually on three axes). A magnitude and direction of gravity can be detected when the electronic device is stationary. The acceleration sensor may be further configured to identify a posture of the electronic device, and is used in an application such as switching between a landscape mode and a portrait mode or a pedometer.

The range sensor 180F is configured to measure a distance. The electronic device may measure a distance through infrared or laser. In some embodiments, in a photographing scenario, the electronic device may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device may emit infrared light by using the light emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user puts the electronic device close to an ear for making a call, so that automatic screen-off is implemented to achieve power saving. The optical proximity sensor 180G may also be used in a leather case mode or a pocket mode to automatically unlock or lock the screen.

The ambient light sensor 180L is configured to sense ambient light brightness. The electronic device may adaptively adjust brightness of the display 194 based on the sensed brightness of the ambient light. The ambient light sensor 180L may also be configured to automatically adjust white balance during photographing. The ambient light sensor 180L may further cooperate with the optical proximity sensor 180G to detect whether the electronic device is in a pocket, so as to avoid an unintentional touch.

The fingerprint sensor 180H (also referred to as a fingerprint recognizer) is configured to collect a fingerprint. The electronic device may implement fingerprint-based unlocking, application access locking, fingerprint-based photographing, fingerprint-based call answering, and the like by using a feature of the collected fingerprint. In addition, for other records about the fingerprint sensor, refer to the international patent application PCT/CN2017/082773 entitled "NOTIFICATION PROCESSING METHOD AND ELECTRONIC DEVICE", which is incorporated herein by reference in its entirety.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide visual output related to the touch operation. In some other embodiments, the touch sensor 180K may be alternatively disposed on a surface of the electronic device, and is located at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device may receive key input, and generate key signal input related to user settings and function control of the electronic device.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to come into contact with or be separated from the electronic device. The electronic device may support one SIM card interface or N SIM card interfaces, where N is a positive integer greater than 1. The SIM card interface 195 may support a nano-SIM card, a micro-SIM card, a SIM card, and the like. A plurality of cards can be simultaneously inserted into the same SIM card interface 195. The plurality of cards may be of a same type or of different types. The SIM card interface 195 is also compatible with different types of SIM cards. The SIM card interface 195 is also compatible with an external storage card. The electronic device interacts with a network by using the SIM card, to implement functions such as a call function and data communication. In some embodiments, the electronic device uses an eSIM, namely, an embedded SIM card. The eSIM card may be embedded into the electronic device, and cannot be separated from the electronic device.

A mobile phone is used as an example to describe a voice assistant function.

Figure 3A:
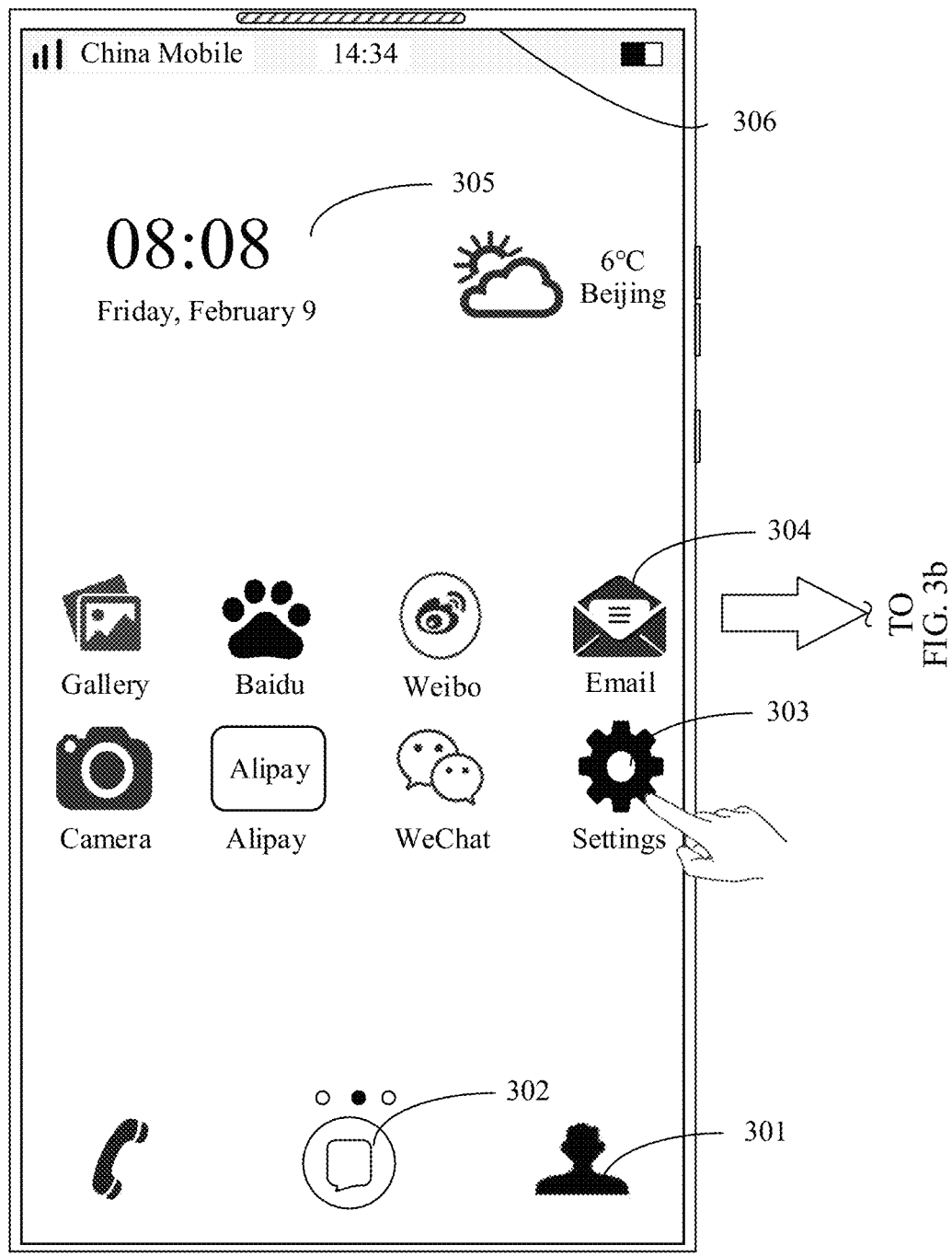
FIG. 3a to FIG. 3d are a schematic diagram of a display interface of an electronic device according to an embodiment of this application.

FIG. 3a to FIG. 3d show a method for turning on a voice wakeup service. An interface a shown in FIG. 3a is a graphical user interface (Graphical User Interface, GUI) of a home screen of the mobile phone. An icon of at least one APP may be presented on the home screen GUI of the mobile phone. Some icons include only images, for example, a contacts icon 301 and a messaging icon 302. Some icons include images and text, for example, a settings icon 303 and an email icon 304. Details are not described again. The interface a shown in FIG. 3a further includes a time bar 305 and a top bar 306. The time bar 305 may display a current moment, for example, may display the current moment to be a date, a week, time, and the like. In addition, the time bar 305 may include location information and weather information (in another embodiment, a weather bar may be set independently, and details are not described herein). The top bar 306 may be configured to display a current communications status, a communications service provider, moment information, power information, and the like of the mobile phone. In addition, the top bar 306 may further display information such as a Bluetooth connection status, a wireless network connection status, and a personal hotspot connection status. This is not particularly limited herein.

Figure 3B:
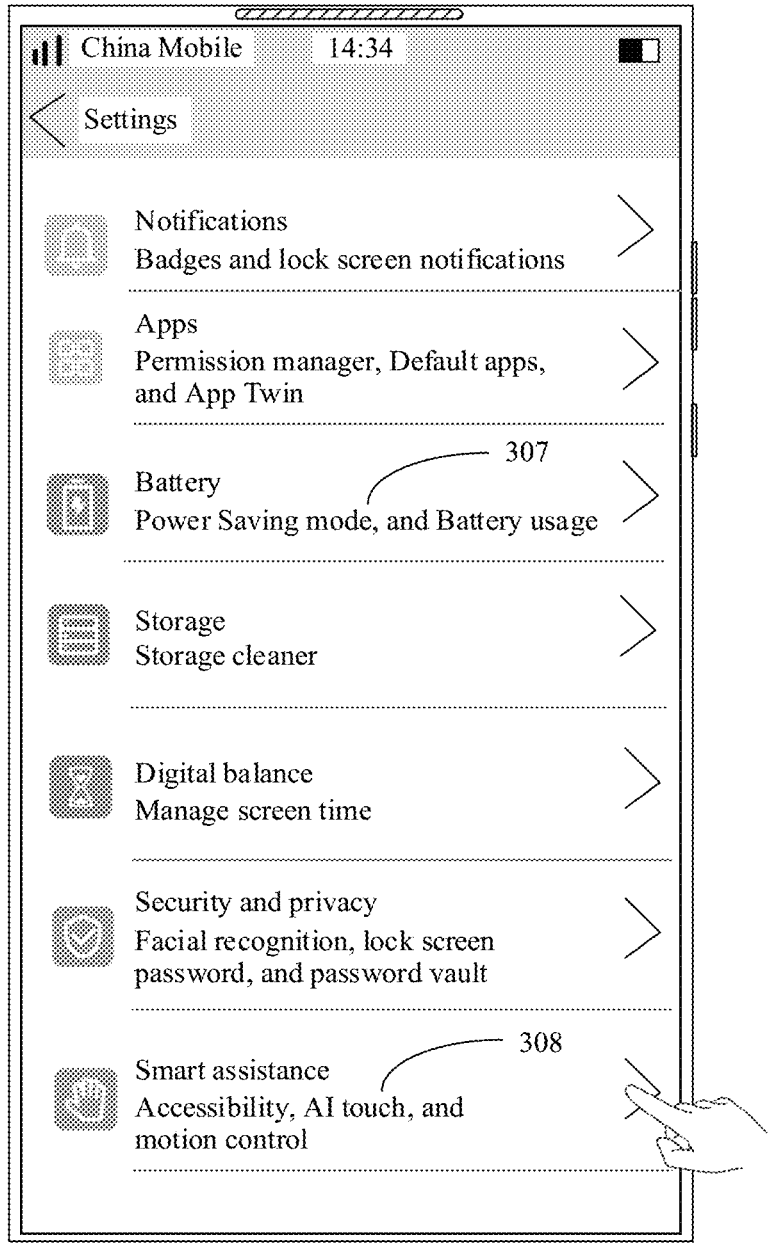
Figure 3C:
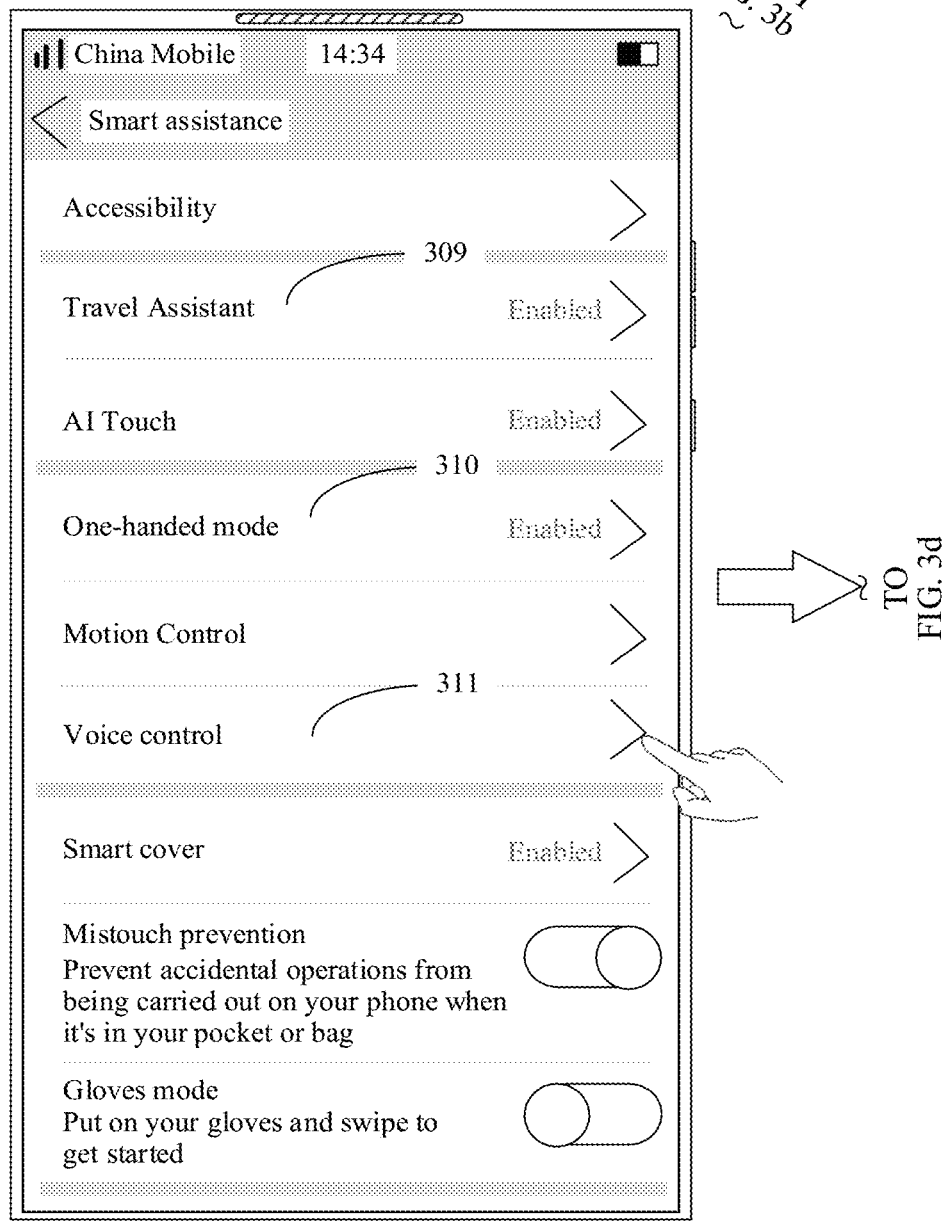

A user may tap the settings icon 303 on the interface a, and in response to the touch operation, the mobile phone displays an interface b shown in FIG. 3b. The interface b shown in FIG. 3b may display various setting information, and the user may perform a touch operation on each piece of setting information to enter setting of corresponding content. For example, the user may tap a battery 307 to set the mobile phone to enter a power saving mode, or view a power consumption status of the mobile phone.

The user may tap a smart assistance 308 on the interface b. In response to the touch operation, the mobile phone displays an interface c shown in FIG. 3c. The smart assistance 308 may be used by the user to implement various assistant functions such as a travel assistant 309, a one-handed mode 310, and a voice control 311, as shown in the interface c in FIG. 3c, details are not described again.

Figure 3D:
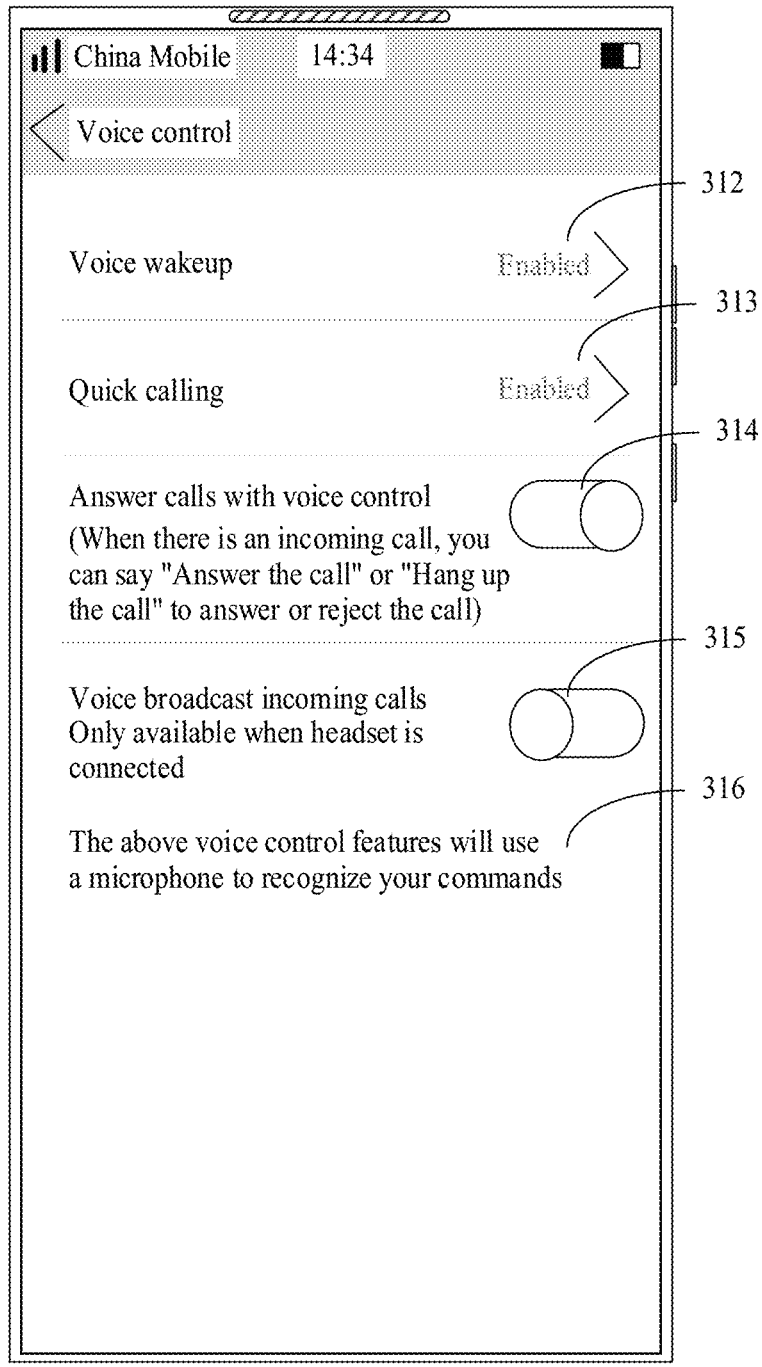

The user may tap the voice control 311 on the interface c, so that the mobile phone displays an interface d shown in FIG. 3d. On the interface d in FIG. 3d, the user may tap a corresponding arrow on the right of voice wakeup 312, to turn on or turn off a voice wakeup function. In addition, the user may further turn on or turn off functions such as quick calling 13, answer calls with voice control 314, and voice broadcast incoming calls 315 as required. Details are not described herein again. The interface d shown in FIG. 3d further displays prompt information 316 used to prompt the user that "These voice control features will use your microphone to identify your commands".

Figure 4A:
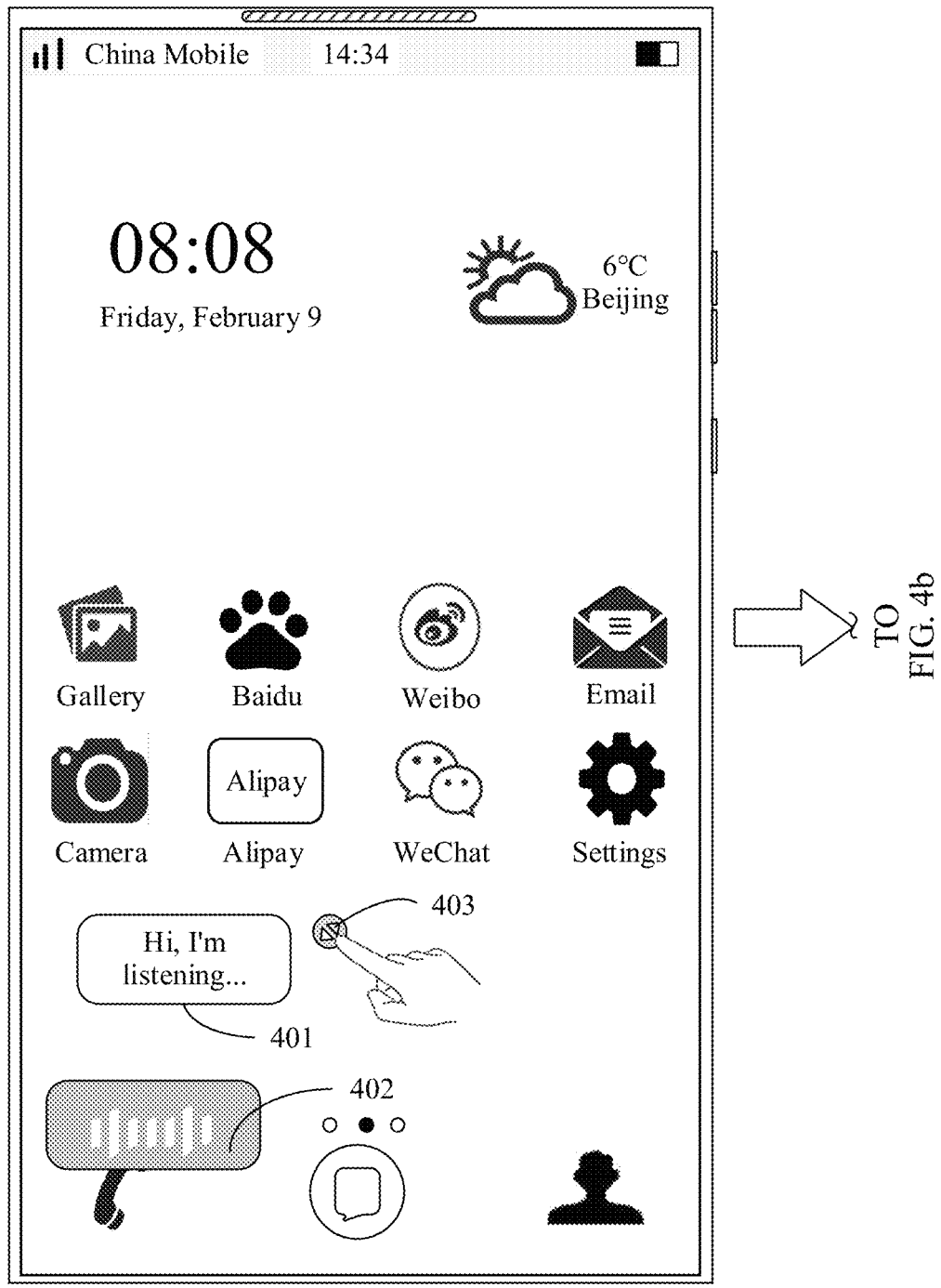
FIG. 4a, FIG. 4b, and FIG. 4c are a schematic diagram of another display interface of an electronic device according to an embodiment of this application.
Figure 4B:
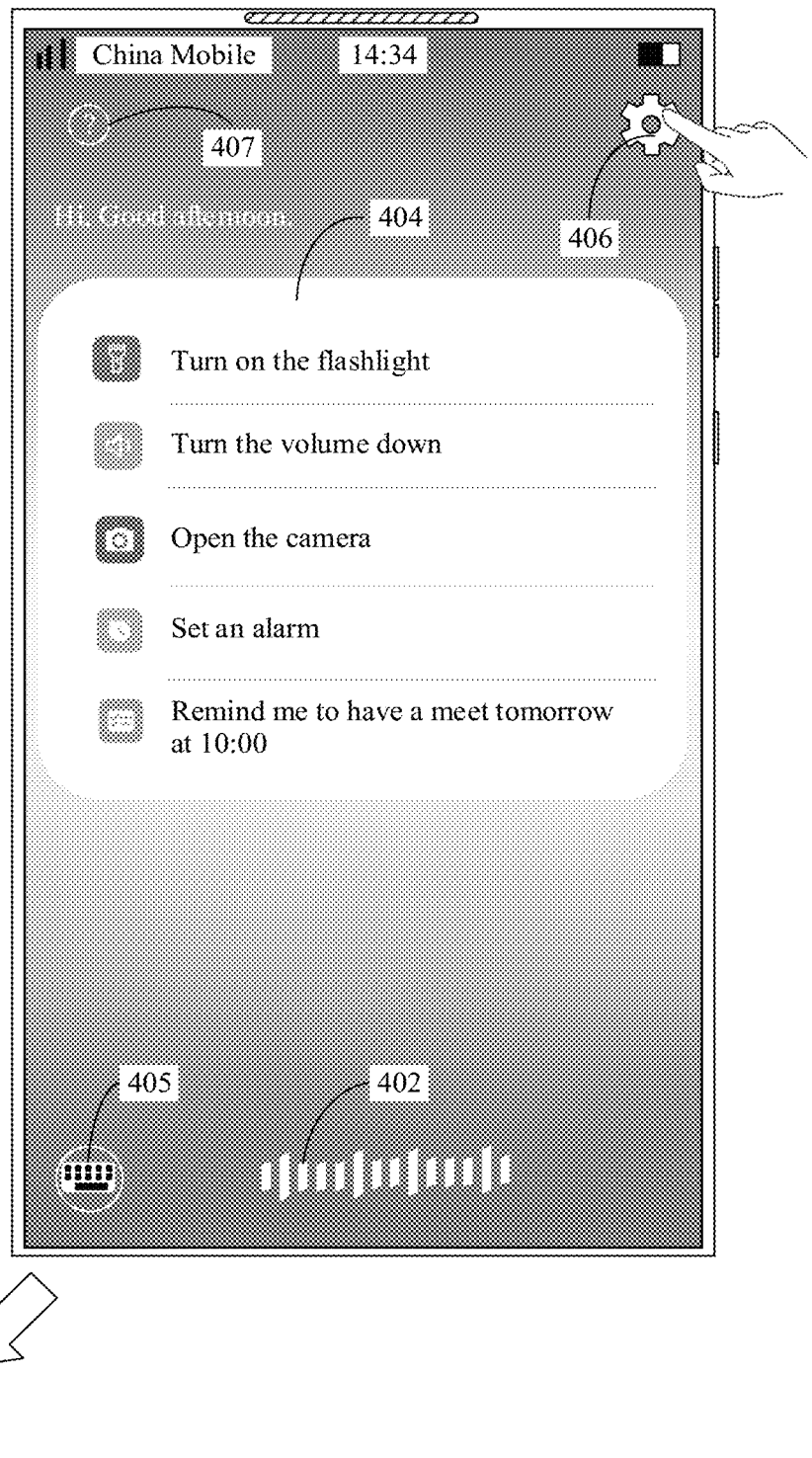
Figure 4C:
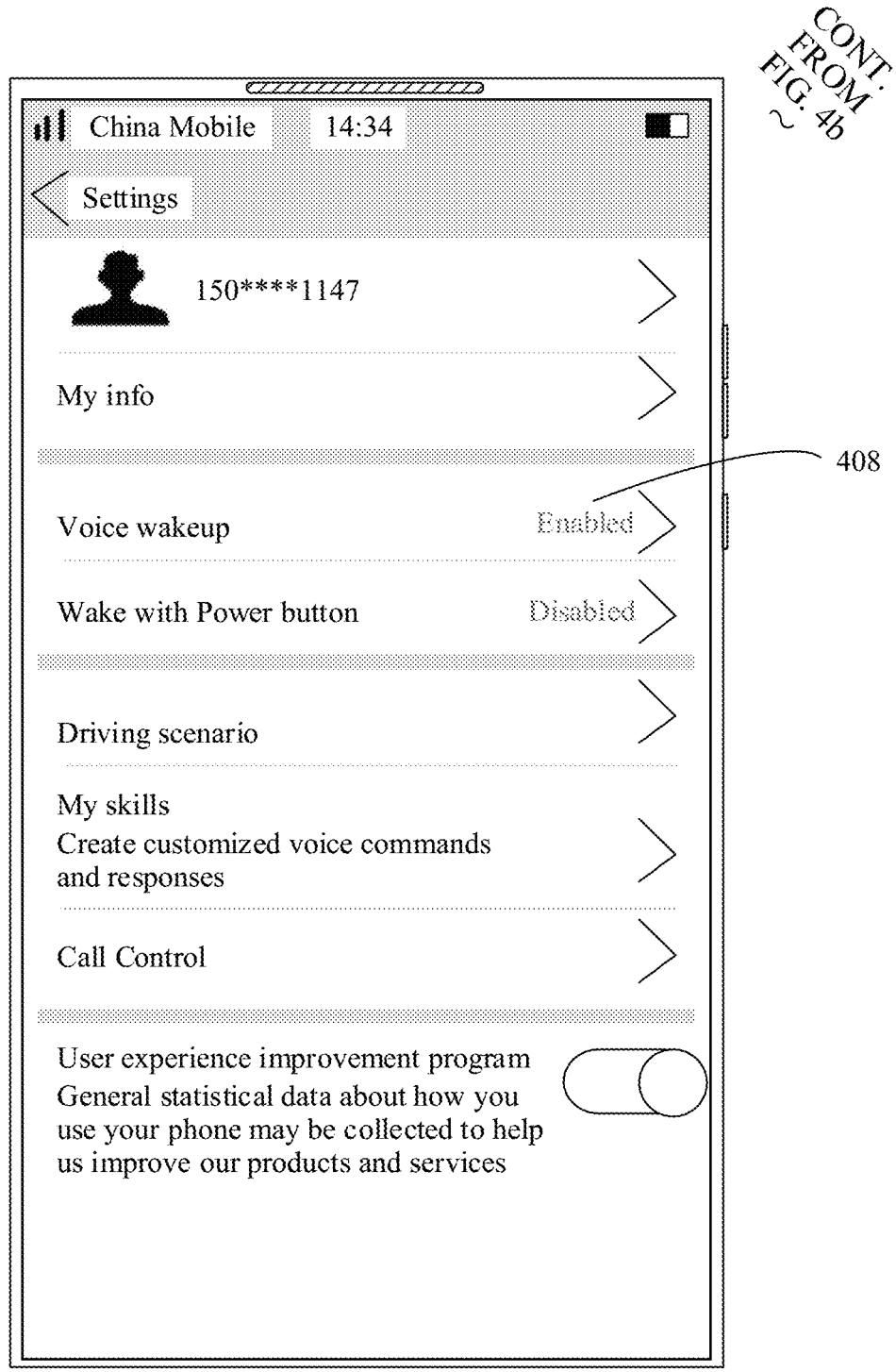

After the voice wakeup function is turned on, the user can wake up the mobile phone by using a wakeup word. FIG. 4a, FIG. 4b, and FIG. 4c show such a case.

An interface a shown in FIG. 4a is still the GUI of the home screen of the mobile phone. It is assumed that the wakeup word of the mobile phone is "Xiaoyi, Xiaoyi" (which is an example without special limitation, and may be "Hi, Ski", "Xiaoai, Xiaoai", "Xiaodu, Xiaodu", or the like in another scenario). If the user utters a voice, at least one of a text prompt bar 401, a voice prompt bar 402, and a zoom-in button 403 may be displayed on the current display interface.

The text prompt bar 401 is configured to prompt, by using a text, the user that a voice service is currently being provided for the user. For example, when the user says "Xiaoyi, Xiaoyi", the voice assistant service of the mobile phone may be woken up. In this case, "Hi, I'm listening . . . " may be displayed in the text prompt bar 401. For another example, when the user says "Open the Weibo", the voice assistant service in a wakeup state may recognize this voice command, and in this case, "Open the Weibo" may be displayed in the text prompt bar 401. The text displayed in the text prompt bar 401 may be real-time. For example, when the user says "Open the Weibo", a speaking speed is relatively slow. In this case, the text prompt bar 401 may display currently recognized voice commands one by one. Displayed content may be "Open . . . " at first, and then after the user finishes this sentence "Open the Weibo", currently displayed content may follow to change to "Open the Weibo". In addition, the voice assistant service can reply to the voice commands sent by the user through voice. For example, if it is received and recognized that the user says "Open the Weibo", the speaker of the mobile phone may output a sound of "OK, open the Weibo for you" to reply to the user.

The voice prompt bar 402 is configured to indicate whether a user voice is currently being collected, and/or sound intensity of a currently collected user voice. For example, the mobile phone may continuously collect a sound signal of a current environment. In a relatively quiet environment, when the user does not utter a voice, the mobile phone cannot collect a sound signal. In this case, the voice prompt bar 402 may not display a waveform, or display a stationary waveform. If the user utters a voice, the mobile phone can collect a sound signal, and the voice prompt bar 402 may display a dynamically changing waveform, to prompt the user that a sound is currently collected.

If the user taps the zoom-in button 403 on the interface a in FIG. 4a, in response to the touch operation, the mobile phone may display an interface b shown in FIG. 4b, where the interface b is an enlarged display interface of the voice assistant. The interface b shown in FIG. 4b may also display the voice prompt bar 402. Based on a collected voice command of the user, a voice command list 404 is displayed on the interface b. The voice command list 404 may be obtained by collecting and analyzing a voice sent by the user. For example, if the user says "Turn on the flashlight", the mobile phone collects a sound signal, performs voice recognition on the collected sound signal, obtains the voice command, and displays the recognized command in the voice command list 404. In addition, the interface b further provides a text input manner for the user: a keyboard button 405. The user may tap the keyboard button 405 to invoke a keyboard, and perform a touch operation on the keyboard to modify, delete, or add content of the voice command list 404. The interface b shown in FIG. 4b may further display a voice setting icon 406 and a help icon 407.

If the user taps the voice setting icon 404 on the interface b shown in FIG. 4b, the mobile phone displays an interface c shown in FIG. 4c. The interface c may display user information, for example, a user profile picture, a user name (may be a mobile phone number), and "My info". The user can tap arrows on the right of these options to modify or complete the user information. The interface c in FIG. 4c may further display to-be-set content of the voice assistant service. The user may tap a voice wakeup 408 to turn on or turn off the voice wakeup function. A wake with power button function is similar and is not described here. The user can also set a current scenario. If the user is driving, the user can choose "Driving scenario" to perform personalized design for the voice assistant service. In addition, the user can create customized voice commands to complete corresponding operations in "My skills", to provide the user with a better friendly and personalized voice assistant service. In addition, the user can participate in the user experience improvement program to help the developer further improve and enhance the product experience.

In this embodiment of this application, the user may perform setting in the smart device, to turn on or turn off the voice wakeup service of the smart device. After the voice wakeup service of the smart device is turned on, the smart device may collect a sound signal, perform voice recognition on the sound signal, and then respond to a recognized wakeup word or voice command. For example, if the wakeup word of the mobile phone is "Hi, xiaoyi", if the mobile phone performs voice recognition on a collected voice, and recognizes that the user says "Hi, xiaoyi", the voice assistant service equipped on the mobile phone is woken up. In this case, the speaker of the mobile phone can also output a response voice "I'm here". For another example, when a voice service assistant equipped on a smart television is in a wakeup state, the voice service assistant may collect a sound signal and recognize a voice command. If it is recognized that a user says "Play the Nirvana in Fire", the smart television may play the Nirvana in Fire (an example of TV series) on a display screen, to implement a response to the voice command sent by the user.

Figure 1:
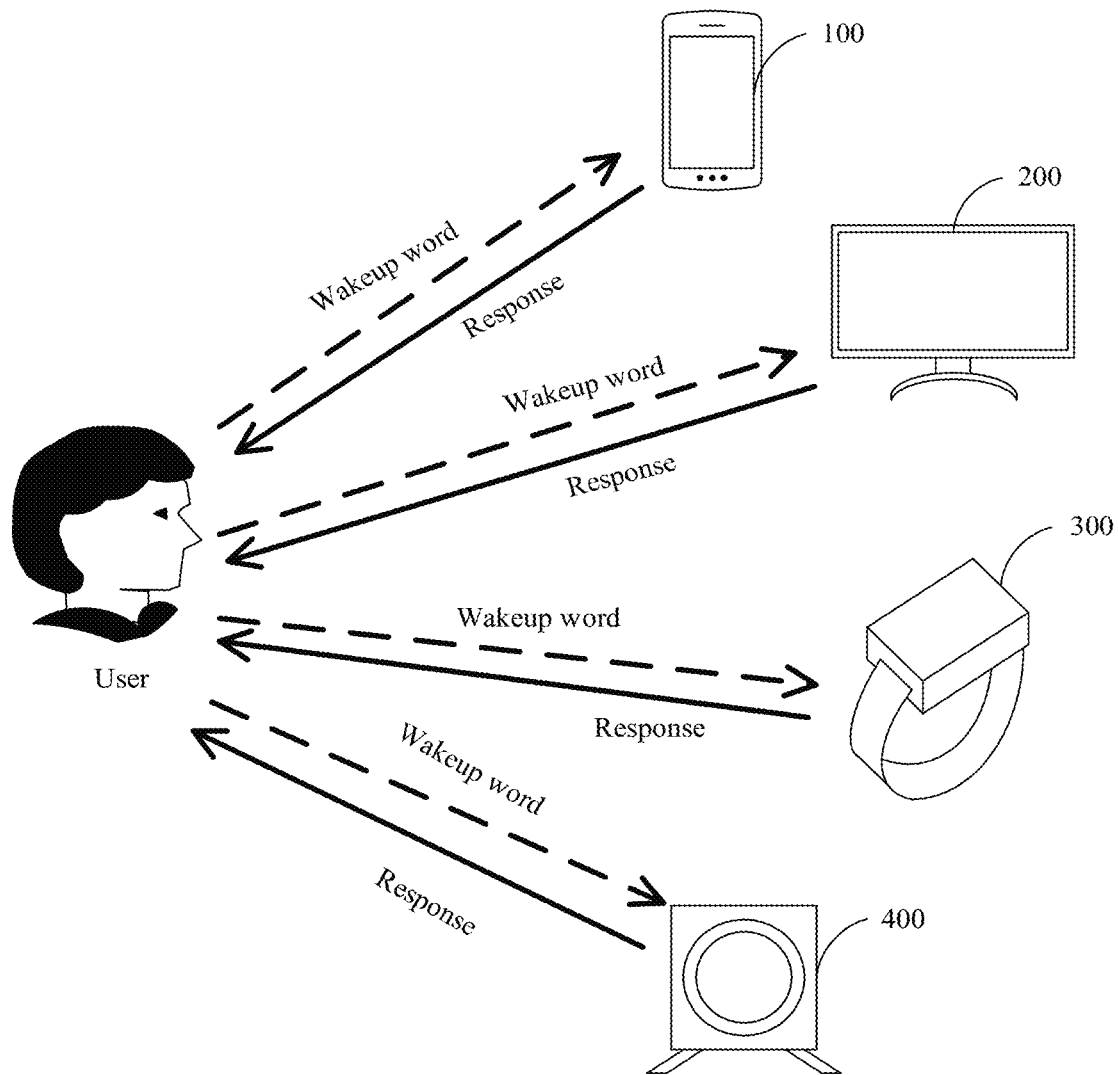
FIG. 1 is a schematic diagram of a voice wakeup response scenario in the conventional technology.

As shown in FIG. 1, when there are a plurality of smart devices and at least two smart devices have a same wakeup word, if the smart device directly responds to the wakeup word after recognizing the wakeup word, the plurality of smart devices may respond to the same wakeup word. Consequently, the voice control experience is poor.

Figure 5:
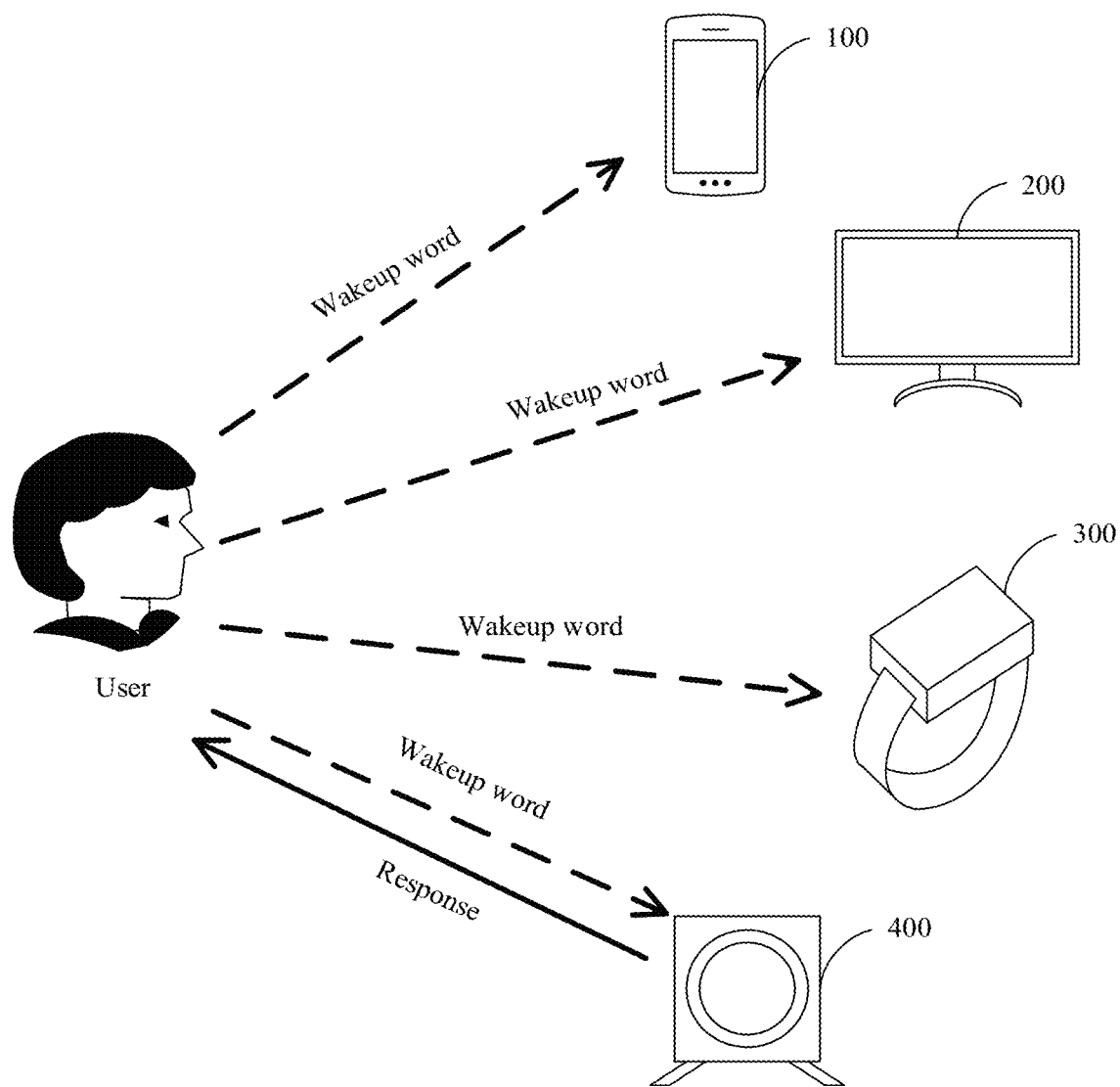
FIG. 5 is a schematic diagram of a voice wakeup response scenario according to an embodiment of this application.

In this case, the plurality of smart devices may perform collaborative response. To be specific, data synchronization is performed between the plurality of smart devices, and an appropriate smart device is determined based on the data synchronization and according to a preset rule, to respond to the wakeup word sent by the user. FIG. 5 shows such a case. A scenario shown in FIG. 5 is similar to that shown in FIG. 1. A user says a wakeup word, and a mobile phone 100, a smart television 200, a smart band 300, and a smart speaker 400 in a current environment can all collect the sound signal and recognize the wakeup word. In this case, these smart devices may perform collaborative response, to finally determine the smart speaker 400 as a response device of the wakeup word. Therefore, as shown in FIG. 5, the smart speaker 400 responds to the wakeup word, for example, outputs a response voice "I'm here" to implement a response to the wakeup word.

It should be noted that, in this embodiment of this application, whether types of a plurality of smart devices in a same environment are the same is not specifically limited. For example, in a possible scenario, there may be three mobile phones, two smart speakers, and a floor sweeping robot. For another example, there may be only two smart televisions in a scenario in which the user is located.

In addition, in this embodiment of this application, types of voice assistants of a plurality of smart devices in a same scenario may be the same or different, which is not specifically limited. For example, in a scenario, there are only three mobile phones. A voice assistant of one mobile phone may be "Xiaoyi" produced by Huawei, and a voice assistant of another mobile phone may be "Xiao Ai Lite" produced by Xiaomi, and a voice assistant of the other mobile phone may be "Siri" produced by Apple. For another example, in another possible scenario, there are only three mobile phones, and voice assistants of these mobile phones are all "Xiaoyi" of Huawei. As described above, wakeup words of voice assistants produced by companies may be different. In this case, if voice assistants of a plurality of devices are the same, the voice assistants of the plurality of devices are woken up by a same wakeup word, and then, it also needs to perform collaborative response to determine a response device.

Figure 6:
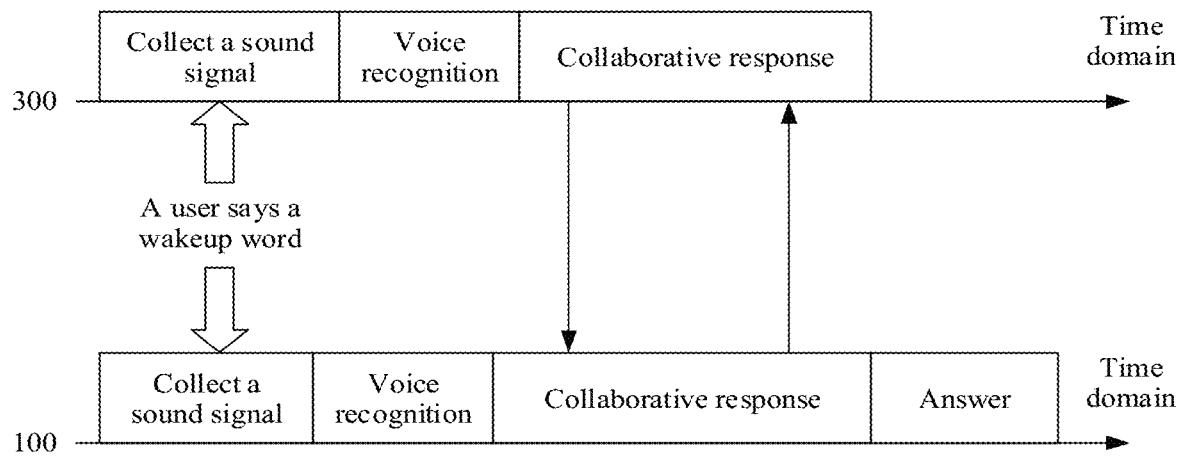
FIG. 6 is a schematic diagram of performing collaborative response between smart devices according to an embodiment of this application.

Referring to FIG. 6, FIG. 6 is a schematic diagram of performing collaborative response between smart devices. For example, in FIG. 6, collaborative response is performed between the mobile phone 100 and the smart band 300. Voice wakeup services of both the mobile phone 100 and the smart band 300 have been turned on by a user. Therefore, both the mobile phone 100 and the smart band 300 can collect a sound signal and perform voice recognition on the collected sound signal. In addition, it is assumed that wakeup words of the mobile phone 100 and the smart band 300 are the same, and are "Xiaoyi, Xiaoyi".

Therefore, if the user says "Xiaoyi, Xiaoyi", both the mobile phone 100 and the smart band 300 may collect the sound signal, and perform voice recognition separately on the collected sound signal. Based on different processors, voice recognition manners, voice collection manners, and the like, processing duration of the mobile phone 100 and the smart band 300 in these stages may be different. After the voice recognition, the mobile phone 100 performs collaborative response processing with the smart band 300. In this process, the mobile phone 100 may send collaboration information of the mobile phone to the smart band 300, and the smart band 300 may also send collaboration information of the smart band to the mobile phone 100, to implement synchronization of respective collaboration information. A response device is determined based on the synchronized collaboration information and a preset response rule. As shown in FIG. 6, the determined response device is the mobile phone 100, and the mobile phone 100 responds to the wakeup word after the collaborative response. However, the smart band 300 does not need to respond to the wakeup word.

In the embodiment shown in FIG. 6, after recognizing the wakeup word, the smart device performs collaborative response, and when determining that the smart device is the response device, the smart device responses (or the smart device does not respond if determining that the smart device is not the response device). In this serial working manner, a response speed of the smart device to the wakeup word is greatly affected by the collaborative response.

Figure 7:
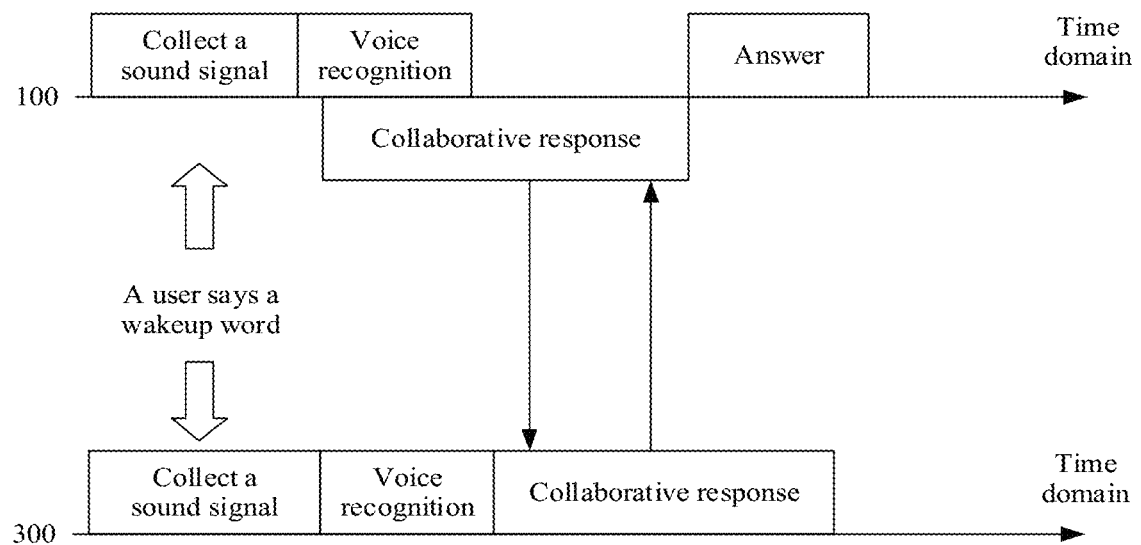
FIG. 7 is another schematic diagram of performing collaborative response between smart devices according to an embodiment of this application.

FIG. 7 is another schematic diagram of performing collaborative response between smart devices. As shown in FIG. 7, when performing voice recognition on a collected sound signal, the mobile phone 100 starts to perform collaborative response. A collaborative response process overlaps with a voice recognition process to some extent, and the two processes are executed nearly in a "parallel" manner. Compared with the serial solution shown in FIG. 6, the solution shown in FIG. 7 can greatly shorten answer duration of the mobile phone 100, which helps improve sound control experience and provides the user with better experience.

In the collaborative response scenario shown in this embodiment of this application, at least two smart devices participate in the collaborative response. The working modes (serial or parallel mode) of the smart devices may be the same or different. For example, in the embodiment shown in FIG. 6, both the mobile phone 100 and the smart band 300 work in a serial mode. However, in the embodiment shown in FIG. 7, the mobile phone 100 performs collaborative response in a "parallel" mode, and the smart band 300 works in a serial manner. It may be understood that, in another possible embodiment, both the mobile phone 100 and the smart band 300 work in a parallel mode, and details are not described again.

In this embodiment of this application, how the smart device responds to the wakeup word may be set by the voice assistant by default. For example, after recognizing the wakeup word, the mobile phone may output a response voice "I'm here, what do you need?" by default. For another example, when responding to the wakeup word, a smart watch may turn on a screen, but has no voice output. For another example, when responding to the wakeup word, the smart speaker may output a segment of preset audio to prompt the user. For another example, when responding to the wakeup, an intelligent temperature control device may perform flashing in a preset manner to prompt the user. The foregoing manners may also be combined. For example, when responding to the wakeup word, the mobile phone may turn on a screen and output a response voice, which is not described herein.

In addition to the default settings, a response manner of the smart device to the voice command can be customized by the user. For example, the user may perform personalized settings on the mobile phone, and cancel a default response voice after the wakeup word is recognized. In this way, after the mobile phone recognizes the wakeup word, the mobile phone does not output the response voice "I'm here, what do you need?". In addition to a customized change for the default setting, the user may further customize and design the response manner of the smart device from at least one aspect of sound (at least one of an answer and a ring), screen display (text, playing a specified image, or the like), light flashing, vibration, temperature (a temperature change), and the like. For example, the user may design a smart watch, to enable the smart watch to vibrate after recognizing a wakeup word, to respond to the wakeup word. For another example, the user may perform customized design on a smart television, so that when the smart television receives a wakeup word, a specified signal lamp flashes once or more times, to respond to the wakeup word. It is not described herein.

A collaborative response process is described.

As described above, when performing collaborative response with another smart device, the smart device needs to synchronize respective collaboration information, and determine a response device of a current wakeup word based on the collaboration information and according to a preset response rule. It may be understood that a sound signal response device needs to meet the preset response rule. When synchronizing the foregoing collaboration information, the smart device may broadcast the collaboration information of the smart device to the outside, and further needs to obtain collaboration information broadcast by another smart device.

In this embodiment of this application, the collaboration information may include but is not limited to at least one of the following: a device type, a latest wakeup moment, a latest response moment, and sound intensity of a sound signal. The device type may be used to indicate a type and a model of the smart device. The closer the latest wakeup moment (or the latest response moment) is to a current moment, the user may continuously use the smart device, and therefore, the more likely the smart device is to be used as the responding device. The sound intensity of the sound signal may be used to reflect a distance between the smart device and the user. Higher sound intensity indicates a shorter distance from the smart device to the user.

In a possible embodiment, a smart device closest to the user may be used as a response device. FIG. 5 is still used as an example. The user says a wakeup word, for example, "Xiaoyi, Xiaoyi". In this case, the mobile phone 100, the smart television 200, the smart band 300, and the smart speaker 400 all collect the sound signal, each smart device starts voice recognition, and after the voice recognition, each smart device starts collaborative response with another smart device; or each smart device starts voice recognition and collaborative response with another smart device in a parallel manner. First, each smart device performs data synchronization. After the data synchronization, each smart device obtains sound intensity of a sound signal collected by each smart device in a current scenario. Therefore, for the mobile phone 100, if sound intensity of the mobile phone 100 is not the highest, the mobile phone 100 is not a response device of the sound signal and does not perform response processing. Similarly, the smart television 200 and the smart band 300 also do not perform response processing. However, after the data synchronization, if the smart speaker 400 determines that sound intensity of the sound signal collected by the smart speaker 400 is the highest and the preset response rule that the smart speaker is closest to the user is met, the smart speaker 400 responds to the wakeup word, and may play preset audio to prompt the user that the smart speaker 400 starts to respond.

In another possible embodiment, a smart device whose latest wakeup moment is closest to a current moment may be alternatively used as the response device. Still using FIG. 5 as an example, each smart device collects a sound signal, performs voice recognition, and performs collaborative response. During collaborative response, collaborative data of each device is first synchronized, where at least a latest wakeup moment of each device is synchronized. In this case, if the current moment is 19:25, a latest wakeup moment of the mobile phone 100 is 19:00, a latest wakeup moment of the smart television 200 is 9:00, a latest wakeup moment of the smart band 300 is 15:30, and a latest wakeup moment of the smart speaker 400 is 19:15. Therefore, the latest wakeup moment of the smart speaker 400 is closest to the current moment, and the preset response rule is met. In this case, the smart speaker 400 starts to play preset audio to respond to a wakeup word. Other devices may not respond.

In another embodiment, a smart device whose latest moment of responding to the wakeup word is closer to the current moment may be alternatively used as the responding device. An implementation is similar to that in the foregoing embodiment, and details are not described again.

In another possible embodiment, the response device may be alternatively determined by combining the foregoing at least one type of collaboration information.

In a possible design, numerical processing may be performed on the at least one type of collaboration information, and then weight (a weighted sum, a weighted average value, or the like) processing is performed on a value of each piece of collaboration information, to obtain a score of each collaboration device. A higher score of the device indicates a higher possibility that the device is a device that the user wants to control by voice. Therefore, the smart device with the highest score is used as the response device. When each piece of collaboration information is numerically processed, the latest wakeup moment and the closer the latest response moment are closer to the current moment, and the value is higher. The sound intensity of the collected sound signal is higher, and the value is higher. A specific numericalization process is not particularly limited in this embodiment of this application.

In this embodiment, the following design may be further provided: Each smart device may synchronize collaboration information of each smart device with another smart device (for example, at least one of a device type, a latest wakeup moment, a latest response moment, and sound intensity of a sound signal). Therefore, after the data synchronization, each smart device separately calculates a score of the smart device, and further determines, according to the score, whether the smart device is a response device. Alternatively, after obtaining collaboration information of each smart device, each smart device may directly calculate a score of the smart device in the foregoing manner, and then interact with another smart device with the score of the smart device. An amount of data to be exchanged is relatively small, which helps accelerate a data exchange speed and shorten data exchange duration. In addition, because the scores of the smart devices are directly synchronized, the smart devices do not need to perform calculation again. This further shortens calculation duration, the devices can respond to the user more quickly, and voice control experience of the user is improved.

In another possible case, at least one of the device type, the latest wakeup moment, the latest response moment, and the sound intensity of the sound signal may be compared, to determine the response device. For example, after a user says a wakeup word, a mobile phone A and a mobile phone B in a current environment perform collaborative response. In this case, device types of the mobile phone A and the mobile phone B are the same, sound intensity of collected sound signals is the same, the mobile phone A has responded to the user within 30 s before a current moment, the mobile phone B has not responded to the user within the latest 30 s, and therefore, the mobile phone A may be used as a response device to respond to the wakeup word. For another example, after a user says a wakeup word, a mobile phone A and a mobile phone B in a current environment perform collaborative response. In this case, scores that are of the mobile phone A and the mobile phone B and that are obtained in the foregoing manner are the same. In this case, a latest response moment of the mobile phone A is closer to a current moment, and therefore, the mobile phone A may be used as a response device to respond to the wakeup word.

In addition, it should be noted that in smart devices that actually participate in the collaborative response, there may be a smart device that does not match the wakeup word. For example, in a possible scenario, there is an iPhone, and a wakeup word of the iPhone is "Hi, Ski". There are two Huawei phones in the environment. Wakeup words of the two Huawei phones are "xiaoyi". In this case, when a user says "xiaoyi", only two Huawei phones can be woken up, and the iPhone cannot be woken up. However, after the user says the wakeup word, all the two Huawei phones and the iPhone can collect sound signals and perform voice recognition.

In this case, based on different working manners of the foregoing collaborative response, there may be the following cases:

In an implementation scenario, a smart device may perform voice recognition and collaborative response in a serial manner. In this scenario, if the user says the wakeup word "xiaoyi", the iPhone may determine, based on voice recognition, that this wakeup word is not the wakeup word of the iPhone, that is, semantics of a sound signal do not match the wakeup word of the iPhone. In this case, the iPhone may not participate in the collaborative response. Specifically, the iPhone may not receive collaboration information synchronized by another smart device, and/or may not send collaboration information of the iPhone to the another smart device. Therefore, only two Huawei phones participate in the collaborative response.

In another implementation scenario, a smart device performs voice recognition and collaborative response in a "parallel" manner. In this case, because a collaborative response process overlaps with a voice recognition process, it is very likely that the smart device has started collaborative response before a wakeup word in a sound signal is recognized, that is, before determining whether the sound signal includes a wakeup word of the smart device, the smart device is likely to broadcast collaboration information of the smart device to another smart device. It may be understood that in this case, the collaboration information may not include information about whether the wakeup word matches.

The foregoing scenario is still used as an example. In this scenario, the three mobile phones separately collect sound signals. Because a voice recognition result is not obtained, it is not determined whether the sound signal matches a wakeup word of the mobile phone. In this case, all the three mobile phones may participate in the collaborative response. In this case, there may be a variety of designs.

In a possible embodiment, collaborative response may be performed twice. During the first collaborative response, electronic devices may broadcast respective collaboration information to the outside. The collaboration information may specifically include but is not limited to at least one of a device type, a latest wakeup moment, a latest response moment, or sound intensity of a sound signal. In addition, when the electronic device obtains a voice recognition result of the electronic device, the electronic device may further broadcast the voice recognition result to the outside, to notify the other electronic devices whether a wakeup word matches. For example, in the foregoing examples, the three mobile phones may separately broadcast the collaboration information of the three mobile phones. Then, a second round of collaborative response is performed, and the three mobile phones separately broadcast whether they match the wakeup word. It may be understood that the iPhone does not match the wakeup word "xiaoyi". Therefore, even if the iPhone is closest to the user and the user has just woken up the iPhone, the iPhone will not be used as a response device of "xiaoyi".

In another possible embodiment, collaborative response may be performed once. Electronic devices separately broadcast respective collaboration information to the outside. The collaboration information may specifically include but is not limited to at least one of a device type, a latest wakeup moment, a latest response moment, or sound intensity of a sound signal. Each electronic device may determine a response device based on this. In this case, if the determined response device determines, based on a voice recognition result, that the sound signal does not match a wakeup word of the determined response device, the determined response device sends a broadcast to notify the other electronic devices to perform response. For example, in the foregoing examples, the three mobile phones may separately broadcast respective collaboration information. Then, based on this, it is determined that the iPhone has the highest score. However, the iPhone determines, through voice recognition, that the iPhone did not match the wakeup word "xiaoyi", so the iPhone can send a broadcast to notify the other two phones that the iPhone does not match the sound signal. Therefore, a Huawei phone with a higher score in the two Huawei phones may be used as the response device of the wakeup word "xiaoyi".

When each smart device performs collaborative response, respective collaboration information needs to be synchronized between the smart devices. This process may be implemented by using a Bluetooth low energy (Bluetooth low energy, BLE) scanning broadcast interface provided by an Android (Android) system.

In other words, in this embodiment of this application, the coordinated response is implemented by using Bluetooth. Therefore, in the collaboration solution provided in this embodiment of this application, the smart device needs to enable a Bluetooth function to participate in the coordinated response.

Figure 8:
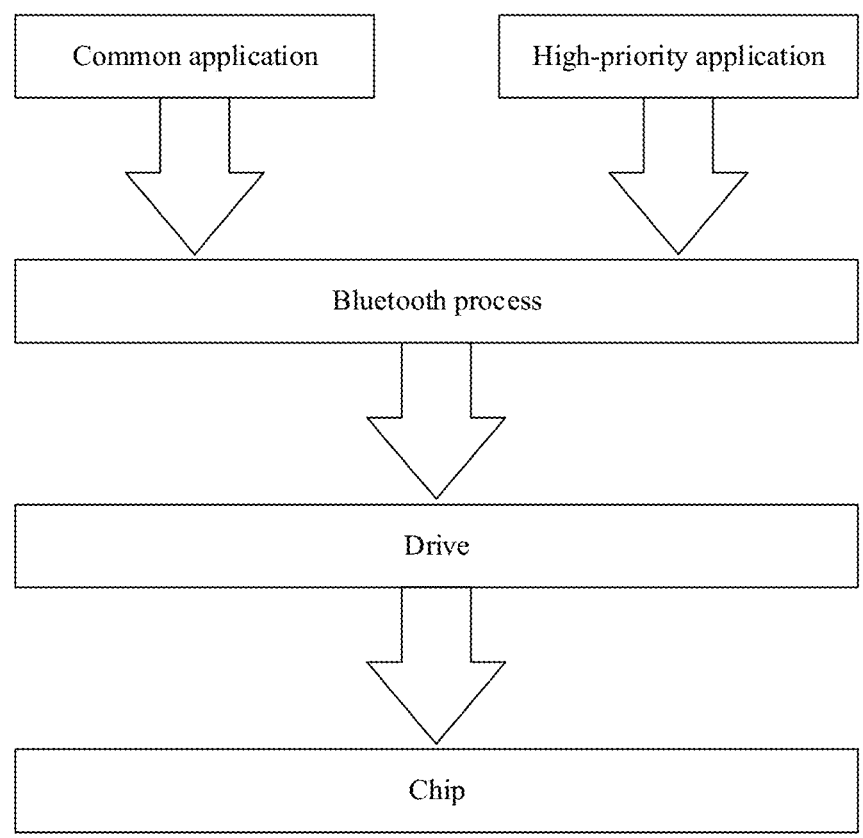
FIG. 8 is another schematic diagram of a structure of an electronic device according to an embodiment of this application.

FIG. 8 shows a system framework diagram of a smart device. As shown in FIG. 8, a foreground application of the smart device, including a second application and a first application, may invoke a Bluetooth process through an application programming interface (Application Programming Interface, API), for example, a BLE scanning broadcast interface. In this way, a capability provided by a Bluetooth chip can be used. The Bluetooth process is connected to the Bluetooth chip by using a driver. The driver in this embodiment of this application may include but is not limited to a secure digital input and output card (Secure Digital Input and Output Card, SDIO) driver and a universal asynchronous transceiver/transmitter (Universal Asynchronous Receiver/Transmitter, UART) driver (also referred to as a serial port driver).

In this embodiment of this application, an application in the smart device may be divided into a second application and a first application. The first application requires relatively short scanning duration. Therefore, in this embodiment of this application, the second application and the first application use different scanning policies, so that the first application may perform scanning by using relatively short scanning duration, which improves a response speed of the first application.

In a possible embodiment, the first application may be a voice assistant application, and the second application may be another application other than the voice assistant application. For example, the second application may be a health application. The health application may communicate with a smart band (or a smart watch) through Bluetooth, to obtain at least one type of data: a heart rate, a body temperature, a sleep status, or a movement status of a user from the smart band. For another example, the second application may be WeChat, and may be specifically WeChat shake. The user may shake the mobile phone to trigger Bluetooth to scan surrounding devices or other data. For another example, the second application may alternatively be a smart bicycle APP, and the user may search, through Bluetooth, whether there is a smart bicycle around.

For the second application, scanning duration has relatively little impact on running and using of the second application. Therefore, scanning may be performed when the second application has a scanning requirement. However, the first application has a relatively high requirement on the scanning duration. If the relatively long scanning duration may affect the use of the first application or user experience. Therefore, when the first application performs scanning, relatively short scanning duration needs to be used, so that a scanning environment may be configured for the first application in advance. In this way, when the first application has a scanning requirement, scanning can be performed directly without configuring the scanning environment, to shorten scanning duration.

Figure 9:
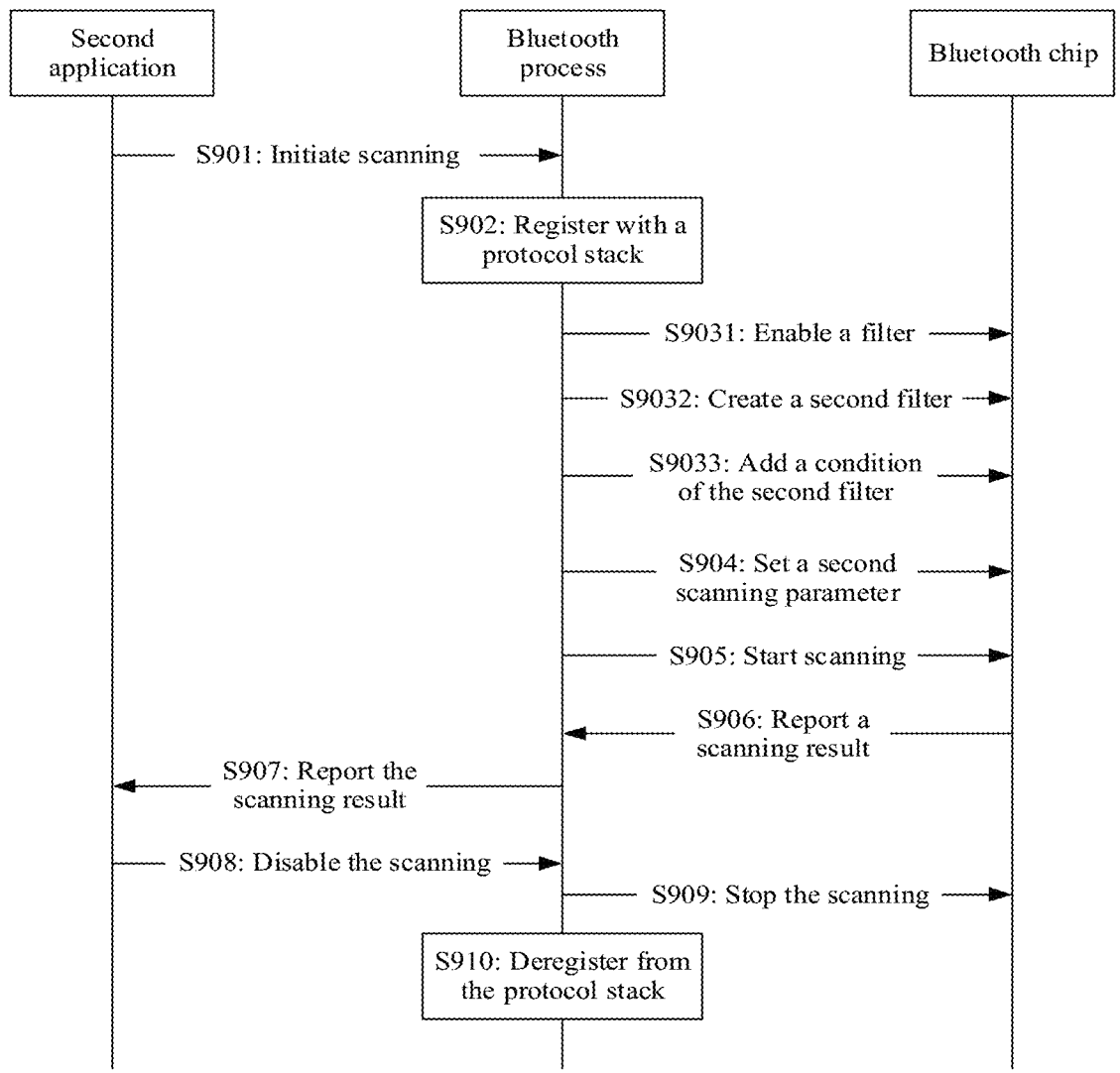
FIG. 9 is a schematic diagram of data exchange of a data processing method according to an embodiment of this application.
Figure 10:
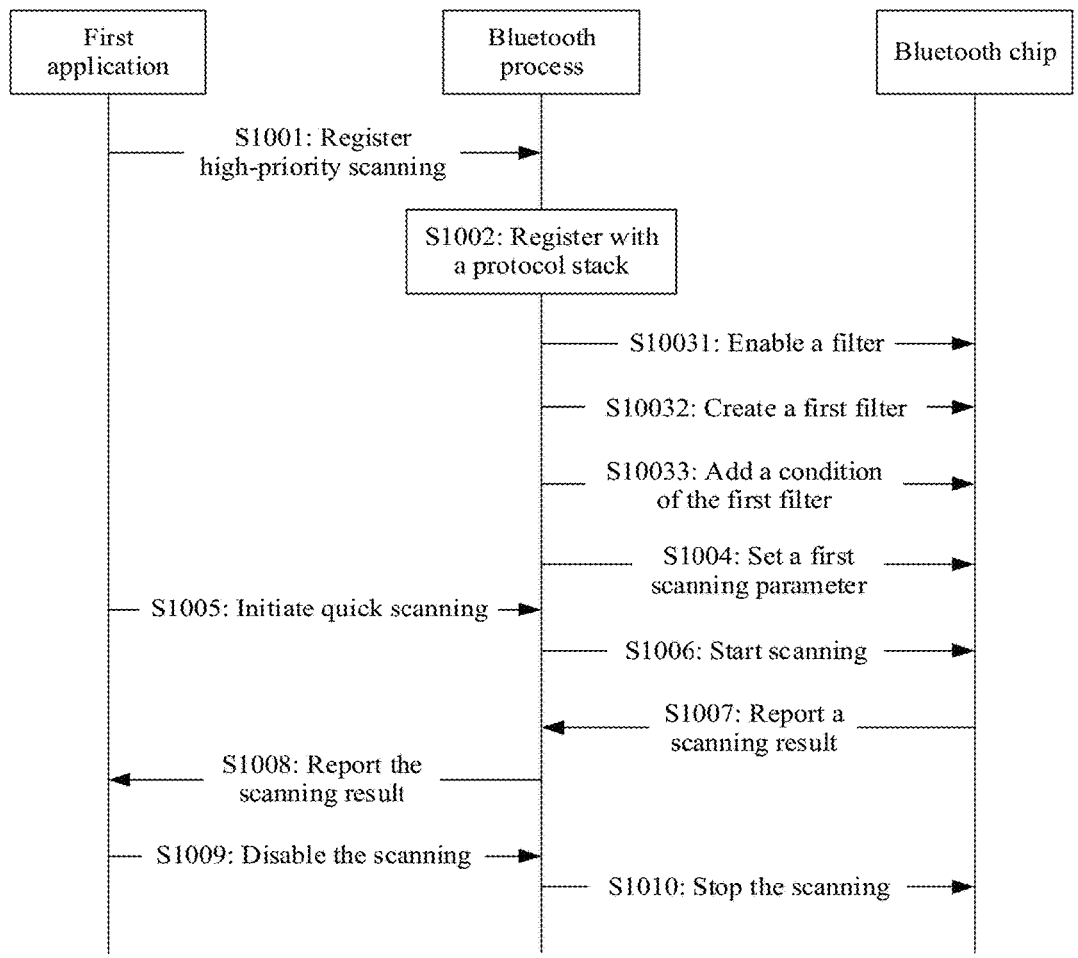
FIG. 10 is a schematic diagram of data exchange of another data processing method according to an embodiment of this application.

FIG. 9 and FIG. 10 separately show these two cases. FIG. 9 shows a data exchange policy when the second application performs scanning by using a Bluetooth chip. FIG. 10 shows a data exchange policy when the first application performs scanning by using a Bluetooth chip.

In one aspect, refer to FIG. 9. When the second application invokes the Bluetooth chip to perform scanning, the method may include but is not limited to the following steps.

S901: The second application initiates scanning.

Specifically, a foreground application of a smart device may initiate scanning by using an API interface, for example, a BLE scanning broadcast interface.

As described above, when the second application has a scanning requirement, the second application may invoke the API interface, to enable a Bluetooth process to configure a scanning environment and enable scanning.

S902: The Bluetooth process registers the scanning with a protocol stack.

The protocol stack (Protocol stack), also referred to as network stack, is a specific software implementation of a computer networking protocol suite.

S903: The Bluetooth process indicates the Bluetooth chip to configure a second filter.

This step specifically includes but is not limited to the following aspects:

S9031: The Bluetooth process indicates the Bluetooth chip to enable a filter.

In this way, the filter in the Bluetooth chip can work.

S9032: The Bluetooth process indicates the Bluetooth chip to create a second filter.

A corresponding filter may be established for each service. One filter may be used to filter one service. Therefore, different services may be distinguished by using the filters. For example, a WeChat shake service may correspond to a filter A, and a smart bicycle service may correspond to a filter B. In this way, when the foreground application is WeChat, and the user scans surrounding devices by using the WeChat shake, device scanning is performed by using the filter A.

When the foreground application of the smart device invokes the Bluetooth process, the Bluetooth process may correspond to different services. Therefore, a filter may be created for the current service to distinguish the current service from other services.

S9033: The Bluetooth process adds a condition of the second filter.

A condition of a filter is used to filter information obtained through scanning in a scanning process. The condition of the filter may include but is not limited to at least one of vendor information, a physical address (for example, a MAC address), service information (for example, whether the current Bluetooth service is a printer application or a projection application), or a device name obtained through Bluetooth scanning. In this embodiment of this application, a quantity of conditions of the second filter may be at least one. The quantity and specific content of the conditions of the second filter are not specifically limited in this application.

For example, a condition of the second filter is the vendor information. For example, vendor information of Huawei is 0101. In this case, when the second filter performs scanning based on this condition, devices whose vendor information is not 0101 may be automatically filtered out. In this way, smart devices of other vendors may be filtered out, to implement data exchange between a plurality of smart devices from the same vendor.

S904: The Bluetooth process sets a second scanning parameter for the Bluetooth chip.

Specifically, this step is used to set a scanning parameter of the second filter for the Bluetooth chip. The scanning parameter in this embodiment of this application may include but is not limited to a duty cycle (duty cycle).

Figure 11:
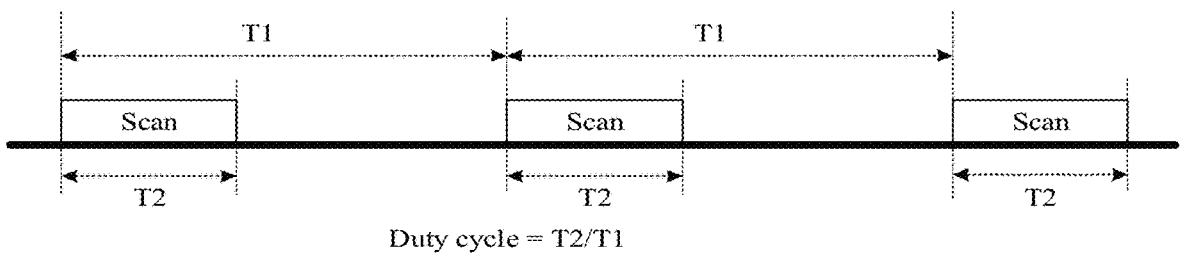
FIG. 11 is a schematic diagram of a duty cycle according to an embodiment of this application.

FIG. 11 is a schematic diagram of a duty cycle. As shown in FIG. 11, the Bluetooth chip may start scanning at an interval (interval) of duration T1. During scanning, scanning duration corresponding to a scanning window (window) is T2, where a value of T2 is less than or equal to T1. The duty cycle is a proportion of duration corresponding to a scanning window (window) in duration of a scanning interval (interval). In other words, the duty cycle=T2/T1. For example, if the Bluetooth chip performs periodic scanning at an interval of 100 ms, and scanning duration corresponding to the scanning window is 10 ms, a duty cycle when the Bluetooth chip performs scanning is 10%. For another example, if the Bluetooth chip performs periodic scanning at an interval of 100 ms, and scanning duration corresponding to the scanning window is 100 ms, a duty cycle when the Bluetooth chip performs scanning is 100%.

Different filters may be used for different services, and duty cycles used by any two filters may be the same or different. For example, the filter A corresponding to the WeChat shake service and the filter B corresponding to the smart bicycle service may use a same duty cycle, or may use different duty cycles.

Based on the foregoing S902 to S904, the Bluetooth process completes configuration of the scanning environment of the second application.

S905: The Bluetooth process indicates the Bluetooth chip to start scanning.

In this way, the Bluetooth chip starts to work, scans the surrounding smart devices, and obtains a scanning result. The scanning process is described in detail below.

As described above, the second application triggers S901 when having a scanning requirement. Therefore, the second application does not need to send a scanning enabling command to the Bluetooth process, and the Bluetooth process can automatically enable scanning after the scanning environment is configured.

S906: The Bluetooth chip reports a scanning result to the Bluetooth process.

S907: The Bluetooth process reports the scanning result to the second application of the smart device.

S908: The second application of the smart device sends a scanning disabling command to the Bluetooth process.

During specific implementation, the second application may stop invoking the API interface of the Bluetooth process.

S909: The Bluetooth process indicates the Bluetooth chip to stop scanning.

After receiving the command, the Bluetooth chip stops scanning and does not receive or actively obtain data from other devices.

S910: The Bluetooth process deregisters from the protocol stack.

When receiving the scanning disabling command, the Bluetooth process can deregister from the protocol stack. In this case, the second filter corresponding to the second application service is released, and the second scanning parameter is no longer retained. In this way, when the second application invokes the Bluetooth module again to perform scanning, a new filter needs to be created again, and a scanning parameter needs to be configured. In other words, the entire process shown in FIG. 9 needs to be re-executed.

In comparison, when the first application shown in FIG. 10, for example, a voice assistant application, performs scanning by using a Bluetooth chip, scanning configuration may be performed in advance for the first application, so that when there is a service requirement, scanning may be directly started, to shorten scanning duration, thereby shortening duration corresponding collaboration.

In the other aspect, refer to FIG. 10. When the first application invokes the Bluetooth chip to perform scanning, the method may include but is not limited to the following steps.

S1001: The first application registers high-priority scanning with a Bluetooth process.

Specifically, a foreground application of a smart device may indicate the Bluetooth process to configure a scanning environment of the first application in advance by using an API interface, for example, a BLE scanning broadcast interface.

Therefore, in a possible embodiment, S1001 may be triggered when Bluetooth of the smart device is turned on. The Bluetooth can be turned on manually by a user or automatically. For example, the Bluetooth may be turned on and off periodically. For another example, the Bluetooth may alternatively be configured to automatically start upon power-on.

In another possible embodiment, S1001 may be triggered when the voice assistant service of the smart device is turned on. The voice assistant service may also be turned on manually by the user or automatically, and details are not described herein.

In another possible embodiment, S1001 may be triggered when the smart device is powered on.

In an actual scenario, the foregoing at least two embodiments may be used in combination. For example, S1001 may be triggered when the Bluetooth is turned on and/or when the voice assistant service is turned on.

S1002: The Bluetooth process registers the scanning with a protocol stack.

S1003: The Bluetooth process indicates the Bluetooth chip to configure a first filter.

Similarly, this step specifically includes but is not limited to the following aspects.

S10031: The Bluetooth process indicates the Bluetooth chip to enable a filter, so that the filter can work.

S10032: The Bluetooth process indicates the Bluetooth chip to create a first filter.

In this embodiment of this application, the first filter is different from the second filter. The second filter is configured to perform filtering scanning for a service with a lower priority, for example, WeChat shake. The first filter is configured to perform filtering scanning for a service with a higher priority, for example, the voice assistant service.

S10033: The Bluetooth process indicates the Bluetooth chip to add a condition of the first filter.

The condition of the first filter may include but is not limited to at least one of vendor information, a physical address (for example, a MAC address), service information (for example, whether the current Bluetooth service is a printer application or a projection application), or a device name obtained through Bluetooth scanning. In addition, a quantity of conditions of the first filter may be at least one. The quantity and content of the conditions of the first filter are not particularly limited in this embodiment of this application.

S1004: The Bluetooth process indicates the Bluetooth chip to set a first scanning parameter.

In this embodiment of this application, the first scanning parameter may alternatively include a duty cycle.

For ease of differentiation, the duty cycle used by the first application is denoted as a first duty cycle, and the duty cycle used by the second application is referred to as a second duty cycle. In this embodiment of this application, the first duty cycle is greater than the second duty cycle. For example, the voice assistant service may perform scanning at a duty cycle of 80%; and the WeChat shake may perform scanning at a duty cycle of 40%.

In a possible embodiment, the first duty cycle in the first scanning parameter may be a maximum duty cycle supported by hardware.

As shown in FIG. 11, if a duty cycle is relatively high, a proportion of scanning duration of a scanning window in scanning duration of a scanning interval is higher, and hardware works more frequently, which is more beneficial to sending and receiving data in a timely manner.

A scanning environment of the first application may be configured by using the foregoing S1001 to S1004. On this basis, when the voice assistant service collects a sound signal of the user and needs to perform collaborative response, the voice assistant service may perform processing in a manner shown in S1005 to S1008, to quickly obtain a scanning result.

S1005: When the first application has a scanning requirement, the first application initiates scanning to the Bluetooth process.

That is, when the voice assistant service needs to perform collaborative response, the voice assistant service may invoke an API interface to send a scanning enabling command to the Bluetooth process, so that the Bluetooth process triggers the Bluetooth chip to work after receiving the command.

S1006: The Bluetooth process indicates the Bluetooth chip to start scanning.

In this way, the Bluetooth chip starts to work, scans surrounding smart devices, and obtains the scanning result. The scanning process is described in detail below.

S1007: The Bluetooth chip reports the scanning result to the Bluetooth process.

S1008: The Bluetooth process reports the scanning result to the first application.

In this way, scanning of the first application can be quickly completed. Compared with the scanning manner (S901 to S910) of the second application shown in FIG. 9, this scanning manner can effectively shorten scanning duration.

It may be understood that, if the first application has a plurality of scanning requirements, steps S1005 to S1008 only need to be performed a plurality of times. For example, FIG. 10 shows only one scanning process, but this should not constitute a limitation on this application.

S1009: After a scanning task is completed, the first application sends a scanning disabling command to the Bluetooth process.

During specific implementation, the first application may stop invoking the API interface of the Bluetooth process.

S1010: The Bluetooth process indicates the Bluetooth chip to stop scanning.

After receiving the command, the Bluetooth chip stops scanning and does not receive or actively obtain data from other devices.

It should be noted that, in the scanning manner of the first application shown in FIG. 10, after the first application sends the scanning disabling command, the Bluetooth process does not perform "deregistration" processing on the high-priority scanning of the first application. In this way, the scanning environment of the first application is still retained. The first filter is not released, and the first scanning parameter may also be stored in the Bluetooth process or the Bluetooth chip. In this way, if the first application subsequently has a new scanning requirement, the first filter or the first scanning parameter does not need to be re-created, and only scanning needs to be directly started in the manner shown in S1005 to S1010. By comparison, the scanning duration of the scanning process (the process between S901 and S907) of the second application shown in FIG. 9 is about 100 ms. However, the scanning process (the process between S1005 and S1008) of the first application shown in FIG. 10 requires only about 40 ms, which effectively shortens the scanning duration. Therefore, collaborative response duration is also effectively shortened, and a response speed of the voice assistant service is improved.

In addition, in another embodiment in FIG. 10, after receiving the scan disabling command, the Bluetooth process may perform "deregistration" processing on the high-priority scanning of the first application. In this implementation, when it is detected that a trigger condition of S1001 is met, the scanning environment of the first application is preconfigured. Compared with the embodiment shown in FIG. 10, this processing manner helps save system resources.

Figure 12:
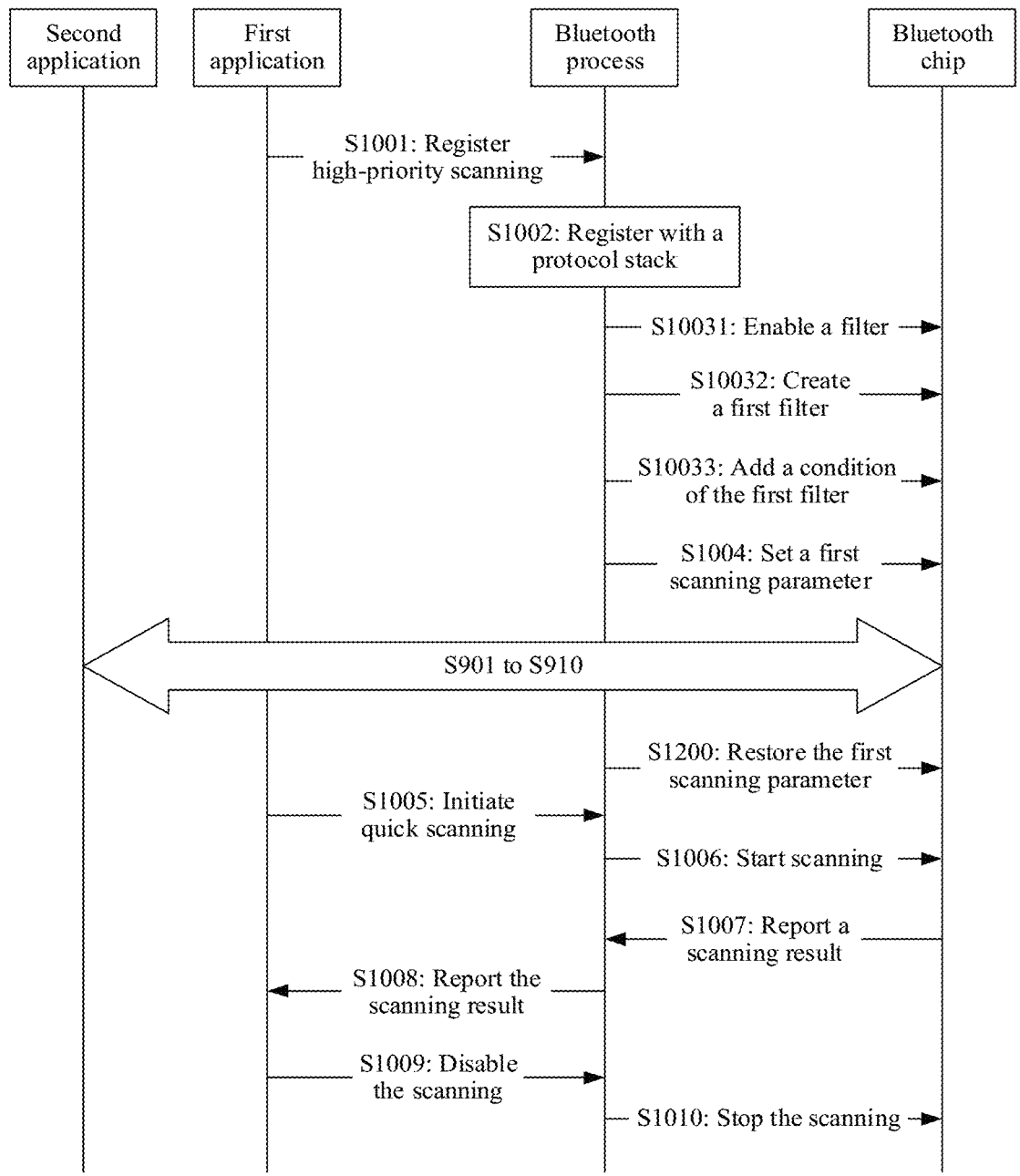
FIG. 12 is a schematic diagram of data exchange of another data processing method according to an embodiment of this application.

In an actual use scenario of the smart device, when Bluetooth of the smart device is turned on, the scanning environment of the first application may be preconfigured, but before the scanning enabling command of the first application is received, the scanning enabling command of the second application may be received. FIG. 12 shows such a case.

As shown in FIG. 12, S1001 to S1004 may be performed in advance, to preconfigure the scanning environment of the first application. However, in the smart device, a user uses the second application, and the second application may perform S901 to S910 after S1004, that is, configure the scanning environment of the second application (create a second filter, and reconfigure the first scanning parameter to the second scanning parameter), and perform scanning, to obtain a scanning result. After receiving the scanning result reported by the Bluetooth thread, the second application may disable the current scanning. When the scanning is disabled, the second filter is released. The scanning process of the second application causes a change of the preconfigured first scanning parameter. When scanning of the second application is disabled, a scanning parameter of the Bluetooth chip may have different designs. For example, in an implementation process of S901 to S910, a scanning parameter used by the Bluetooth chip changes from the preconfigured first scanning parameter to the second scanning parameter. After the scanning of the second application is completed, the Bluetooth chip may continue to use the second scanning parameter. Alternatively, the Bluetooth chip may be restored to default settings (initialization). Alternatively, the second scanning parameter may be changed to the preconfigured first scanning parameter.

Based on the foregoing cases, in this embodiment of this application, S1200 may be performed after the scanning of the second application is completed. That is, after the scanning of the second application is completed, the Bluetooth thread automatically restores the scanning parameter used by the Bluetooth chip to the second scanning parameter. In an embodiment, the Bluetooth thread may directly configure the second scanning parameter in the Bluetooth chip in the manner of S1004, and in this case, the configuration and recovery may be implemented by using data that is of the first scanning parameter and that is recorded in the Bluetooth chip or the Bluetooth process. In another embodiment, the Bluetooth thread may obtain the scanning parameter currently used by the Bluetooth chip. If the scanning parameter currently used by the Bluetooth chip is the first scanning parameter, the Bluetooth thread may not perform processing. Alternatively, if the scanning parameter currently used by the Bluetooth chip is not the first scanning parameter, the first scanning parameter is set. In another embodiment, the Bluetooth thread may configure only some of the plurality of scanning parameters, or may configure all of the scanning parameters. For example, if a duty cycle used by the scanning parameter currently used by the Bluetooth chip is 10%, the first duty cycle in the first scanning parameter is 50%, and other scanning parameters are the same, only the duty cycle in the scanning parameter may be configured. Alternatively, each scanning parameter used by the Bluetooth chip is reconfigured directly based on a preconfigured value of the first scanning parameter.

As described above, in this embodiment of this application, the first filter corresponding to the first application is not released during the scanning of the second application, and may continue to be used. Therefore, the first filter does not need to be configured.

Based on the foregoing configuration, if the first application has a scanning requirement, scanning only needs to be performed in the manner shown in S1005 to S1008. The manner shown in S1005 to S1008 may be performed for a plurality of times, and scanning objects corresponding to the plurality of times of scanning may be the same or different. After the scanning is completed, the scanning is disabled according to S1009 and S1010. In this case, the first filter is still not released, and the first scanning parameter is retained, but the scanning parameter used by the Bluetooth chip is the first scanning parameter.

For example, when Bluetooth of a mobile phone is turned on, a scanning environment may be configured in advance for a voice assistant APP in the manner shown in S1001 to S1004. That is, a first filter and a first scanning parameter of the voice assistant service are preconfigured.

Then, a user opens a smart bicycle APP, and the smart bicycle APP needs to invoke a Bluetooth chip to scan surrounding vehicles or users. In this case, the Bluetooth thread starts to configure a second filter (created) and a second scanning parameter (configured, and in this case, a scanning parameter used by the Bluetooth chip changes from the first scanning parameter to the second scanning parameter) of this Bluetooth service. The Bluetooth chip may perform scanning by using the configured second filter and the second scanning parameter, and report a scanning result. In this way, after obtaining the scanning result, the smart bicycle APP stops invoking the Bluetooth scanning broadcast interface, the Bluetooth process disables the current scanning, the second filter is released, the second scanning parameter is changed, used, or initialized, and the current scanning is deregistered from a protocol stack.

Subsequently, the Bluetooth process restores the scanning parameter in the Bluetooth chip to the second scanning parameter. Specifically, the second scanning parameter may be reconfigured based on a value that is stored in the Bluetooth chip or the Bluetooth process and that is obtained when the second scanning parameter is preconfigured, so that the second scanning parameter is restored. After the restoration, the Bluetooth chip performs scanning by using the second scanning parameter.

Later, the user says a wakeup word of the mobile phone to wake up the voice assistant APP of the mobile phone. In this case, the voice assistant APP needs to perform collaborative response with another smart device. Therefore, the voice assistant APP invokes an API interface to send a scanning enabling command to the Bluetooth process. In this case, a first filter and a first scanning parameter have been configured in the Bluetooth chip, so that the Bluetooth process does not need to configure a filter or a scanning parameter, and may directly send the scanning enabling command to the Bluetooth chip, and the Bluetooth chip performs scanning and reports a scanning result. When the scanning is completed, the scanning is disabled.

In the embodiment shown in FIG. 12, if scanning initiated by the second application is performed, the second scanning parameter of the first application may be automatically restored after the scanning is disabled, to reduce a scanning enabling delay of the first application and increase a response speed.

Figure 13:
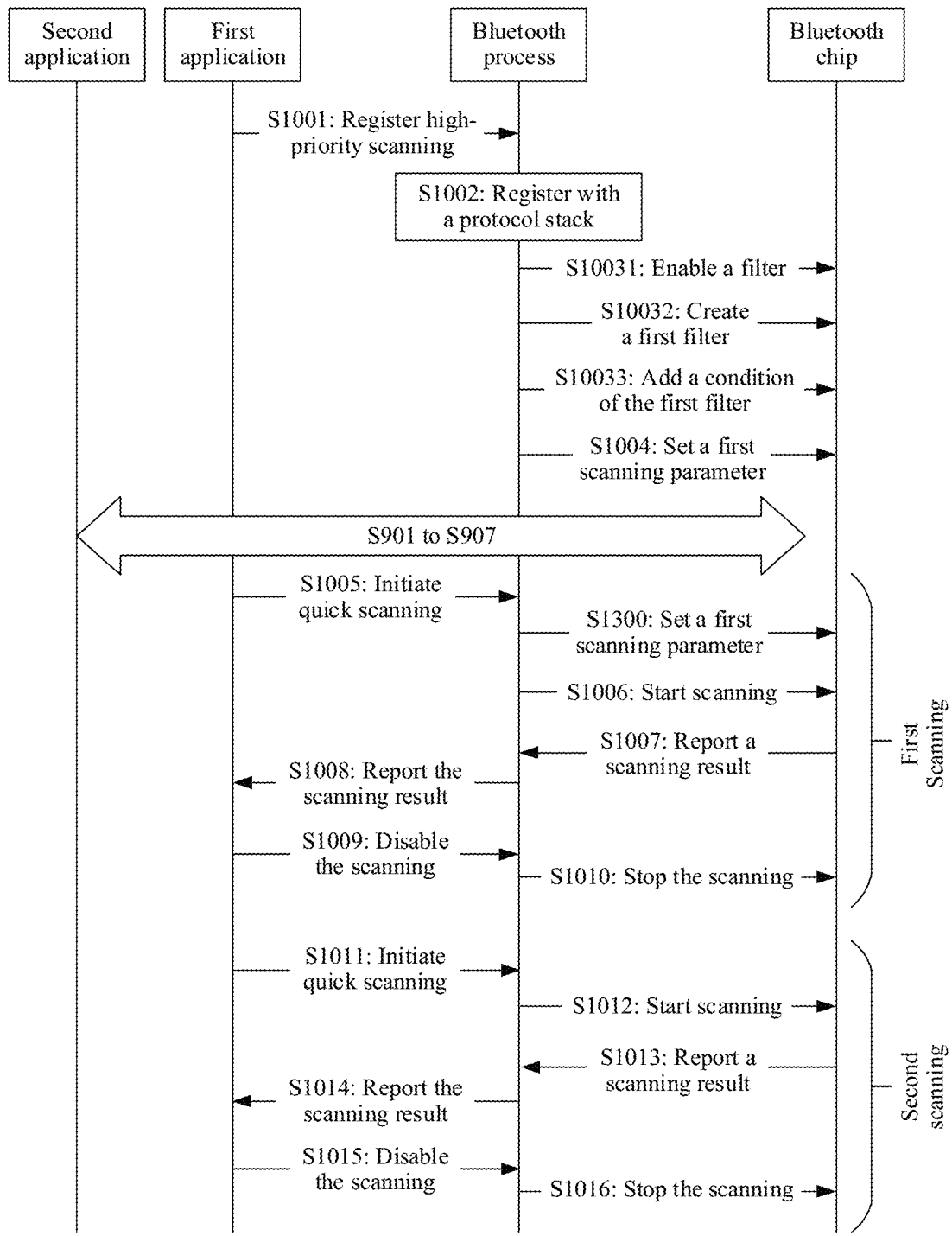
FIG. 13 is a schematic diagram of data exchange of another data processing method according to an embodiment of this application.

FIG. 13 shows another scenario. For example, the second application is WeChat shake, and the first application is a voice assistant APP.

When Bluetooth is turned on or a mobile phone is powered on, S1001 may be triggered, and a scanning environment is preconfigured for the voice assistant APP in the manner shown in S1001 to S1004.

After the Bluetooth is turned on, a user opens WeChat and taps WeChat shake to detect surrounding devices. In this process, scanning is performed according to S901 to S907.

Before the scanning is completed, the user says a wakeup word of the voice assistant APP, and the voice assistant APP needs to perform collaborative respond with another smart device. Therefore, the voice assistant APP invokes an API interface to send a scanning enabling command to the Bluetooth process.

In this case, refer to the first scanning process in FIG. 13. Although the scanning service of the WeChat shake is not completed, to ensure that the voice assistant APP can respond to the user in a timely manner, after the Bluetooth process receives the scanning enabling command, S1300 is performed to set the first scanning parameter, so that the Bluetooth chip can perform scanning based on a higher duty cycle. Subsequently, S1006 to S1010 are performed. The voice assistant APP may obtain collaboration information of the another smart device in a timely manner based on the scanning process, and respond to the user in a timely manner when determining that the voice assistant APP is a responding device.

Subsequently, the user further says the wakeup word of the voice assistant APP. In this case, refer to the second scanning process in FIG. 13. Because the scanning parameter in the Bluetooth chip does not change, the first scanning parameter does not need to be restored or additionally configured, and the first filter is not released. Therefore, when the voice assistant APP initiates a scanning task again, the scanning task may be directly performed in the manner shown in S1011 to S1016.

It should be noted that, in this embodiment, an electronic device preferentially scans the first application. In this case, although a scanning disabling indication of the second application is not received, the scanning of the second application is paused or terminated.

In this case, in a possible embodiment, when S1300 is performed, the electronic device may release the second filter, and does not need to retain the second scanning parameter. Then, the scanning of the second application is terminated.

In another possible embodiment, when performing S1300, the electronic device may retain the second filter, and cache the second scanning parameter in the Bluetooth chip or another location. In this way, when completing scanning of the first application, the electronic device may further reconfigure the second scanning parameter of the second application, and complete a scanning process of the second application. The second filter is released until the scanning of the second application is completed, and the second scanning parameter is restored to the first scanning parameter.

As shown in FIG. 12 and FIG. 13, the technical solutions provided in this application have relatively high compatibility, and a response speed of the smart device is effectively improved without affecting another service procedure.

It should be noted that in this embodiment of this application, the voice service APP may be used as the first application to implement data synchronization and implement collaborative response in any manner shown in FIG. 10 to FIG. 13.

In this embodiment of this application, APPs in the smart device may be classified, and for some first applications of the APPs, quick scanning on the first applications is implemented in a manner of preconfiguring a scanning environment, to improve a response speed of the smart device.

In addition, all APPs in the smart device may be alternatively used as the first applications, and quick scanning of each APP is implemented by preconfiguring a scanning environment, to improve a response speed of the smart device.

A scenario in which a first device scans a third device to obtain collaboration information of the third device is used as an example to describe a scanning manner of the smart device in detail.

Figure 14:
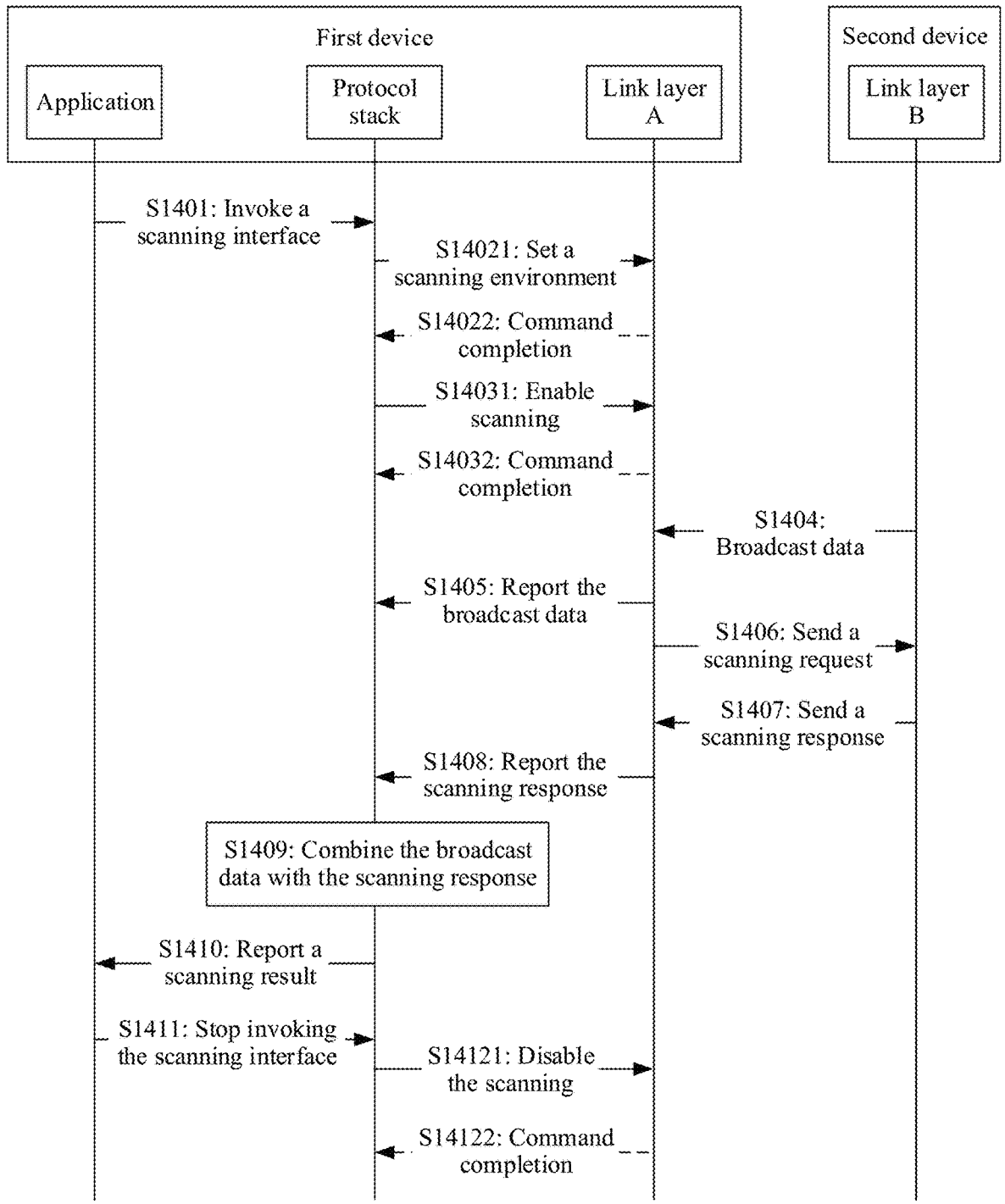
FIG. 14 is a schematic diagram of data exchange of another data processing method according to an embodiment of this application.

FIG. 14 shows a possible embodiment. This scanning process may include the following steps.

S1401: An application of the first device invokes a scanning interface.

For ease of understanding, it is assumed that the first device is a mobile phone, and the third device is a smart television. In a possible scenario, a user says a wakeup word "Xiaoyi, Xiaoyi" in an environment in which a mobile phone and a smart television are included, and the mobile phone may collect the sound signal, and perform voice recognition on the sound signal. In addition, the mobile phone may further perform collaborative response with another device in a parallel or serial manner. In this case, a voice assistant APP in the foreground of the mobile phone invokes the scanning interface to indicate that a protocol stack of a Bluetooth process works.

S1402: A protocol stack of the first device indicates a link layer A to configure a scanning environment.

This step may specifically include S14021, where the protocol stack sends a command for setting a scanning environment to the link layer of a Bluetooth chip, so that the Bluetooth chip sets the scanning environment of a service corresponding to the current application; and S14022, where the link layer A feeds back a command completion notification message.

Specifically, during specific implementation, S14021 includes content in two aspects: setting a filter and setting a scanning parameter. For example, in the embodiment shown in FIG. 9, this step may be detailed as S903 and S904, and S903 includes S9031 to S9033. Details are not described again. For another example, in summary of the embodiment shown in FIG. 10, this step may be detailed as S1003 to S1004, and S1003 includes S10031 to S10033. Details are not described again.

In different embodiments, S14021 may be divided into a plurality of steps. Therefore, there may also be a plurality of command completion notifications corresponding to the step. FIG. 9 is used as an example. In a process of performing S9031 to S904, the protocol stack may receive four command completion notifications.

In a possible design, when the protocol stack receives a command completion notification of a current command, for example, receives an ACK, it can indicate that the current command is completed. In this case, a command of a next step is sent. For example, in an embodiment in FIG. 9, the protocol stack performs S9031, and S9032 is performed only after receiving an ACK. In this case, if the protocol stack receives a command incomplete notification, for example, receives an NCK, it indicates that the command is incomplete. In this case, the protocol stack may send the current command again until an ACK is received. For example, the protocol stack performs S9031. When receiving an NCK, the protocol stack may send a command of "enabling the filter" to the link layer again until an ACK is received. Alternatively, the protocol stack may repeatedly send the current command for a plurality of times, and if an NCK is continuously received and a quantity of times of receiving the NCK reaches a preset specified quantity, the current command is not sent anymore. In this case, the protocol stack may further perform a feedback to the foreground application to notify the foreground application that the scanning fails. For example, the protocol stack performs S9031, and repeatedly sends S9031 when receiving an NCK. If 5 NCKs are consecutively received and no ACK is received, S9031 is not repeatedly sent, but a scanning failure is reported to the foreground application.

In another possible design, when the protocol stack sends a command, the protocol stack may not be affected by a command response sent by the Bluetooth chip. For example, the protocol stack may send S9031. When no ACK is received, the protocol stack may send S9032 to the Bluetooth chip again, to create a filter in the Bluetooth chip. This implementation saves more time.

The setting of the scanning parameter may be determined based on a type of the foreground application of the first device. For example, if a mobile phone foreground is a voice assistant APP, the protocol stack of the Bluetooth process may indicate the link layer A to set the second scanning parameter, so that a scanning chip can perform scanning work at a relatively high duty cycle.

S1403: The protocol stack indicates the link layer A to enable scanning.

Specifically, two steps may also be included:

S14031: The protocol layer indicates the link layer A to enable scanning.

This may correspond to S905 shown in FIG. 9. In this case, the scanning enabling command may be automatically sent by the protocol stack of the Bluetooth process.

Alternatively, this may correspond to S1006 shown in FIG. 10. In this case, the scanning enabling command is sent after the protocol stack receives a request of the first application.

S14032: The link layer A feeds back a command completion notification message.

In this way, the protocol stack may receive an indication of an ACK or an NCK, to determine whether the Bluetooth chip starts scanning. It may be understood that if an NCK is received, the protocol stack may repeatedly send S14031 until an ACK is received, or stop sending S14031 until a specified quantity of NCKs are received.

S1404: The link layer A of the first device receives broadcast data of a link layer B of the third device.

Based on the foregoing configuration, the Bluetooth chip starts scanning, and therefore may receive broadcast data of another device. In this embodiment of this application, broadcast data may include but is not limited to collaboration information of a device. The broadcast data in this step may specifically include collaboration information of the third device.

S1405: The link layer A reports the broadcast data.

S1406: The link layer A sends a scanning request to the link layer B.

S1407: The link layer A receives a scanning response sent by the link layer B.

S1408: The link layer A reports the scanning response.

S1409: The protocol stack of the Bluetooth process combines the broadcast data with the scanning response.

S1410: The protocol stack reports a scanning result.

It may be understood that, in this case, the scanning result reported by the protocol stack is the combined broadcast data and scanning response.

S1411: The foreground application of the first device stops invoking the scanning interface.

S1412: The protocol stack indicates the link layer A to disable the scanning.

In this case, two substeps S14121 and S14122 are included. That is, the protocol stack indicates the link layer A to disable the scanning, and determines that the scanning is disabled when a command completion instruction, such as an ACK, is received.

In the scenario shown in FIG. 14, a broadcast packet broadcast by the third device to the outside may be limited by a packet format or other reasons, and may not carry all collaboration information of the third device participating in a collaborative response. Therefore, a manner in which the first device actively sends a scanning request and receives a scanning response may be used. The scanning response and the broadcast data are combined to obtain the collaboration information of the third device. For example, a broadcast packet of the third device may have only 32 bytes, and a scanning response may also have only 32 bytes, and the collaboration information needs 64 bytes. Therefore, complete collaboration information can be obtained by combining the broadcast packet and the scanning response. Based on this design, in FIG. 14, if the protocol stack does not receive the broadcast data or does not receive the scanning response, the protocol stack cannot perform the step of obtaining the scanning result through combining in S1409.

The scanning manner shown in FIG. 14 is applicable to Bluetooth interfaces of most current Android devices, and has relatively high universality.

Figure 15:
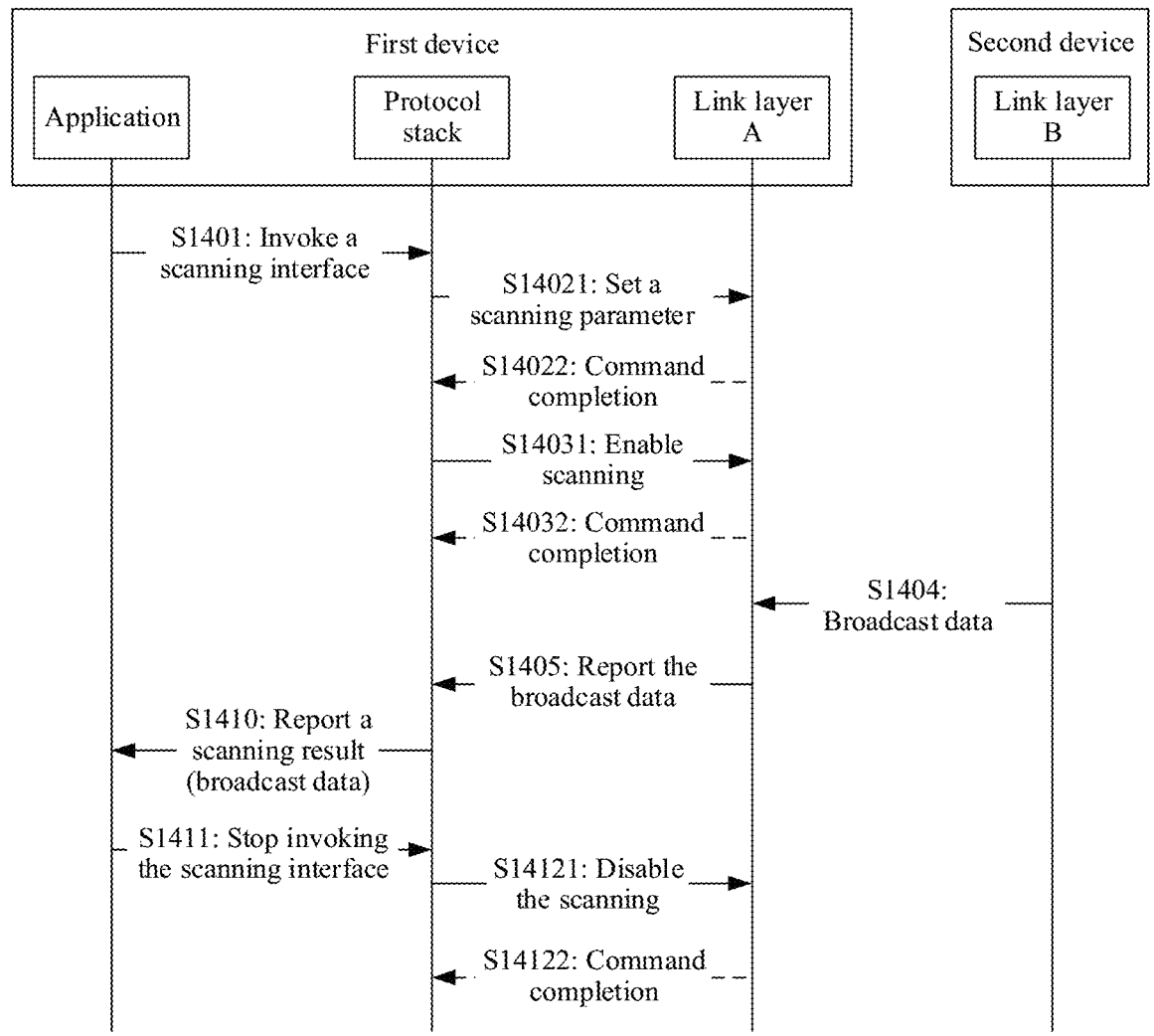
FIG. 15 is a schematic diagram of data exchange of another data processing method according to an embodiment of this application.

FIG. 15 shows a possible embodiment. Compared with that in the embodiment shown in FIG. 14, a scanning process reduces several steps: S1406 to S1409. That is, the steps in which the link layer A actively sends the scanning request to the link layer B, and the scanning request is combined with the scanning response to obtain the scanning result are omitted. In this case, after receiving the broadcast data reported by the link layer A, the protocol stack reports the broadcast data as the scanning result to the foreground application.

It may be understood that, in the embodiment shown in FIG. 15, S1404 to S1405 may be performed at least once. For example, if the broadcast packet may have only 32 bytes, the collaboration information may also use 32 bytes. As shown in FIG. 15, the protocol stack may report the broadcast data once, to obtain the collaboration information of the third device. For another example, the broadcast packet is 32 bytes. If data that needs to be transmitted is 64 bytes, the information may be carried by broadcasting data at least twice. In this case, S404 to S1405 may be performed at least twice. In this case, the protocol stack may combine at least two pieces of broadcast data and then report the data to the foreground application. Alternatively, the protocol stack reports the broadcast data to the foreground application after receiving the broadcast data, and the foreground application obtains the collaboration information based on the received broadcast data. The scanning manner shown in FIG. 15 is relatively simple to implement.

In addition, an embodiment of this application further provides another implementation: The foreground application invokes the BLE scanning broadcast interface to perform scanning (a manner of receiving a broadcast and sending a scanning request), and when the protocol stack receives the broadcast data, the protocol stack performs different processing based on a type of the broadcast data.

Figure 16:
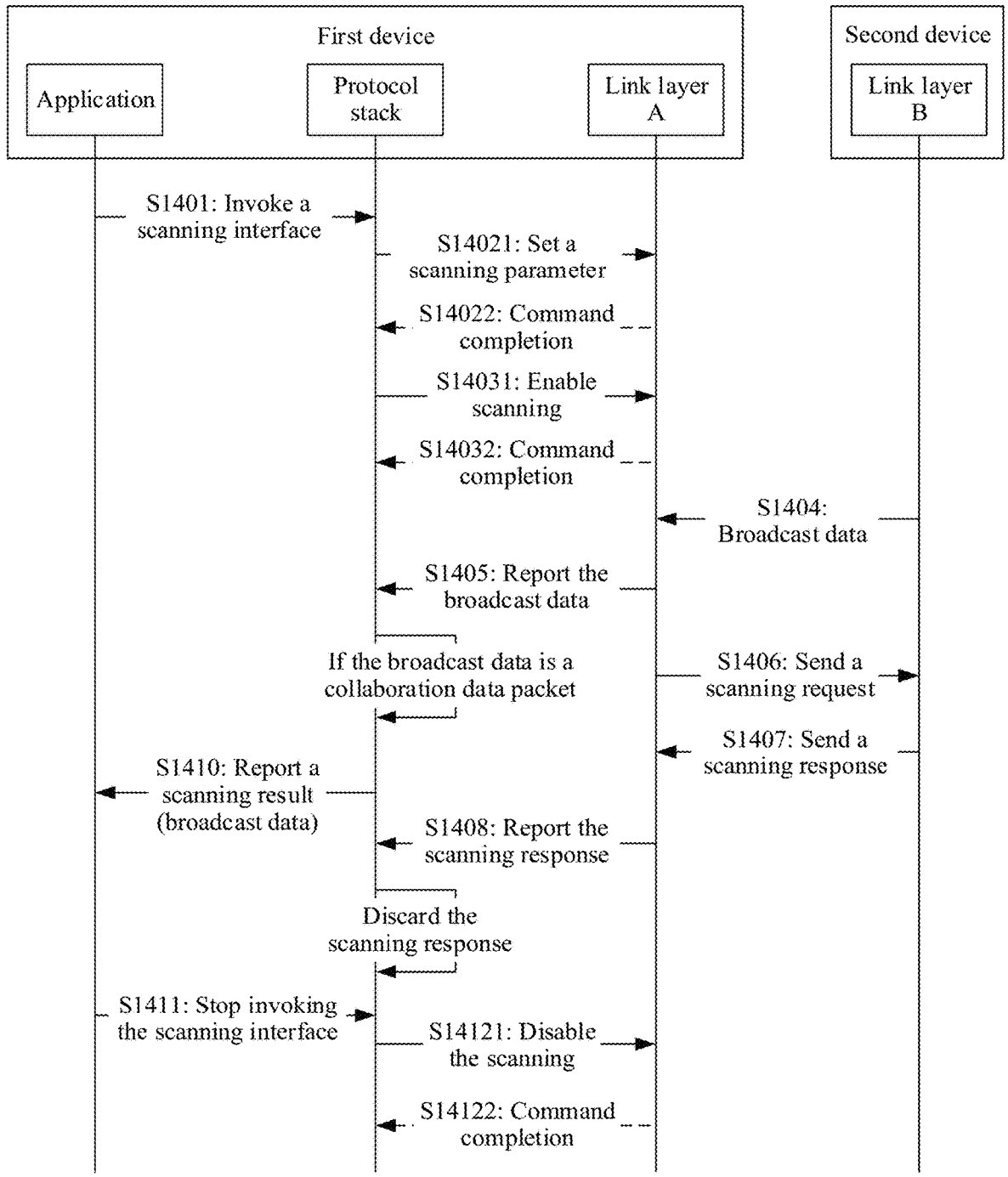
FIG. 16 is a schematic diagram of data exchange of another data processing method according to an embodiment of this application.

Refer to an embodiment shown in FIG. 16. The embodiment shown in FIG. 16 is applicable to a collaborative response scenario of a smart device.

As shown in FIG. 16, a foreground application of a first device invokes a scanning interface (S1401), and performs S14021 to S14032, to complete a scanning environment configuration for a current service. A Bluetooth chip starts to work, and can receive broadcast data broadcast by a third device to the outside, and report the broadcast data to a protocol stack (S1404 and S1405).

The protocol stack may determine whether the current broadcast data is a collaboration data packet. In this embodiment of this application, the collaboration data packet may be a data packet that is synchronized to another smart device when a voice assistant APP participates in collaborative response, and may carry collaboration information of the device. The collaboration data packet may have a specific format or identifier. For example, if a specified field in the received data packet (or packet) has a preset identifier, the current data packet (or packet) may be used as the collaboration data packet. The preset identifier can be customized. For example, a start byte of a value field in the data packet is 0x10. For another example, a packet name of the data packet carries a specified character. In addition, in an embodiment of this application, the collaboration data packet may be a short packet, for example, may be a 32-byte packet.

Therefore, if the protocol stack determines that the broadcast data reported in S1405 is the collaboration data packet, the protocol stack may directly use the broadcast data as a scanning result and report the broadcast data to the foreground application (S1410).

In this embodiment, the Bluetooth chip further actively sends a scanning request, and reports a scanning response to the protocol stack when receiving the scanning response (S1406 to S1408). In this case, the protocol stack determines that the scanning response is a collaboration data packet. Because a scanning result has been reported, the protocol stack discards the scanning response, and does not need to report the scanning response to the foreground application.

After obtaining the scanning result reported by the protocol stack, the foreground application may stop invoking the scanning interface, and disable the scanning (S1411 to S14122).

In this embodiment of this application, the collaborative response scenario of the voice assistant APP is merely an example. The implementation shown in FIG. 16 is applicable to any first application. Details are not described again.

In addition, the broadcast data received by the protocol stack may not be the collaboration data packet. For example, in a scenario in which WeChat shake finds surrounding devices, a data packet received by the protocol stack is not used for a collaborative response of the smart device. In this case, the data packet does not have a preset identifier of the collaboration data packet.

Figure 17:
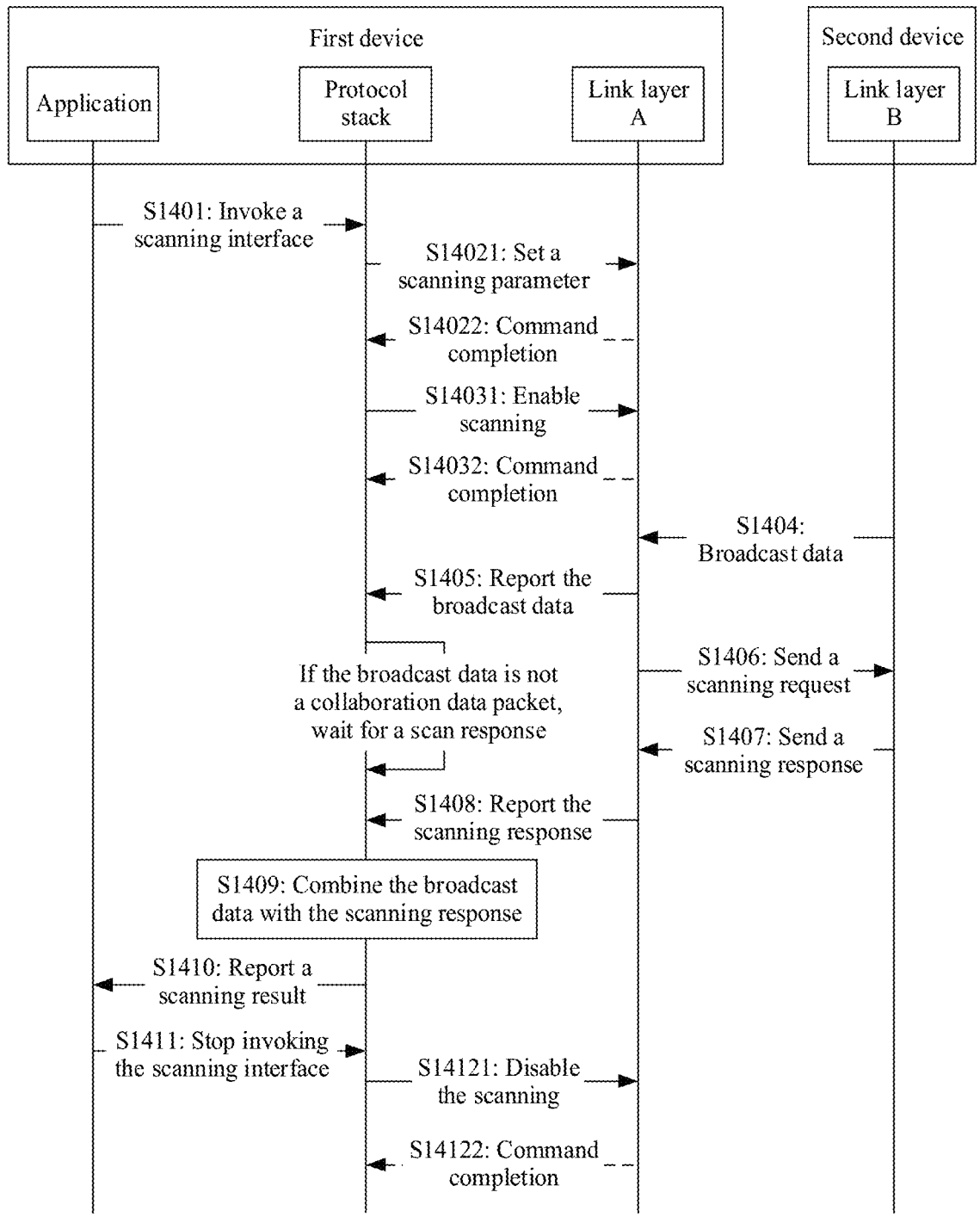
FIG. 17 is a schematic diagram of data exchange of another data processing method according to an embodiment of this application.

In this case, as shown in FIG. 17, after receiving the broadcast data, the protocol stack determines that the packet is not a collaborative response packet, waits for a scanning response until the scanning response is received, combines the broadcast data with the scanning response, and reports a scanning result obtained through combination.

The implementations shown in FIG. 16 and FIG. 17 are applicable to an Android smart device, and for a data packet of a collaborative response, the broadcast data may be directly reported without waiting for a scanning response result. Therefore, to some extent, it reduces a probability that the foreground application cannot receive the scanning result caused by a fact that the scanning response needs to be waited for.

It should be noted that the scanning manners shown in FIG. 15 to FIG. 17 may be used in combination with the configuration manners shown in FIG. 9 to FIG. 13.

Figure 18:
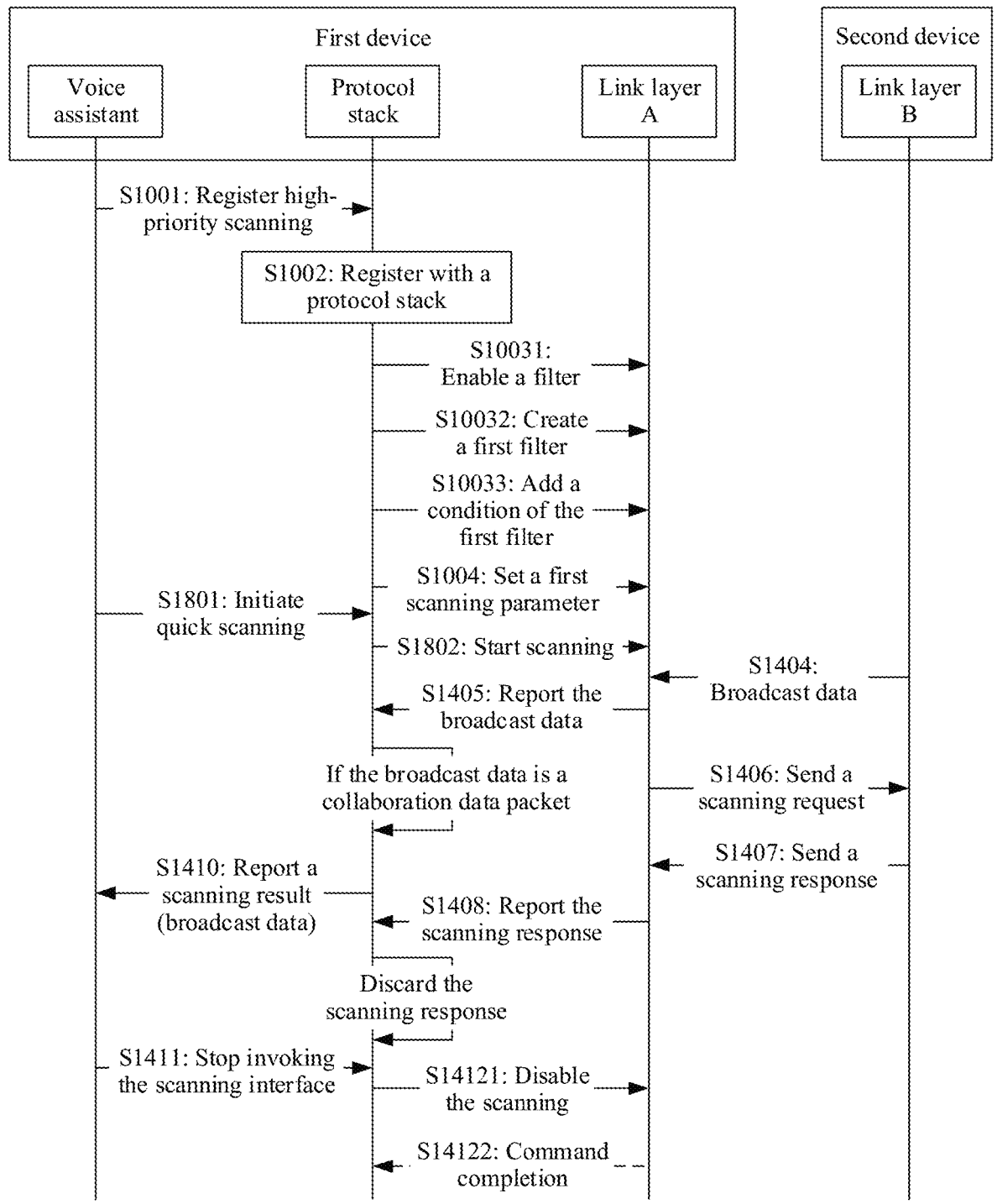
FIG. 18 is a schematic diagram of data exchange of another data processing method according to an embodiment of this application.

For example, FIG. 18 shows a possible scenario. As shown in FIG. 18, a scanning environment of a voice assistant APP may be preconfigured when Bluetooth is turned on (which is an example, and should not be used as a limitation), as shown in steps S1001 to S1004. For an implementation, refer to the manner shown in FIG. 10. Details are not described herein again. After S1004, the voice assistant APP collects a sound signal, and needs to perform collaborative response with another smart device. In this case, the voice assistant initiates scanning to a protocol stack (S1801). Subsequently, the protocol stack also indicates a link layer A to enable scanning (S1802). In this way, the link layer A starts to work, completes synchronization of collaboration information in the manner shown in S1404 to S14122, and further implements the collaborative response. This implementation can effectively improve a response speed of the smart device, and improve user experience.

In addition, it should be noted that the technical solutions provided in the embodiments of this application may not only be applied to a scenario in which smart devices perform collaborative response to respond to a wakeup word, but also may be applied to a scenario in which a plurality of smart devices respond, in a wakeup state, to a voice instruction said by a user.

Figure 19:
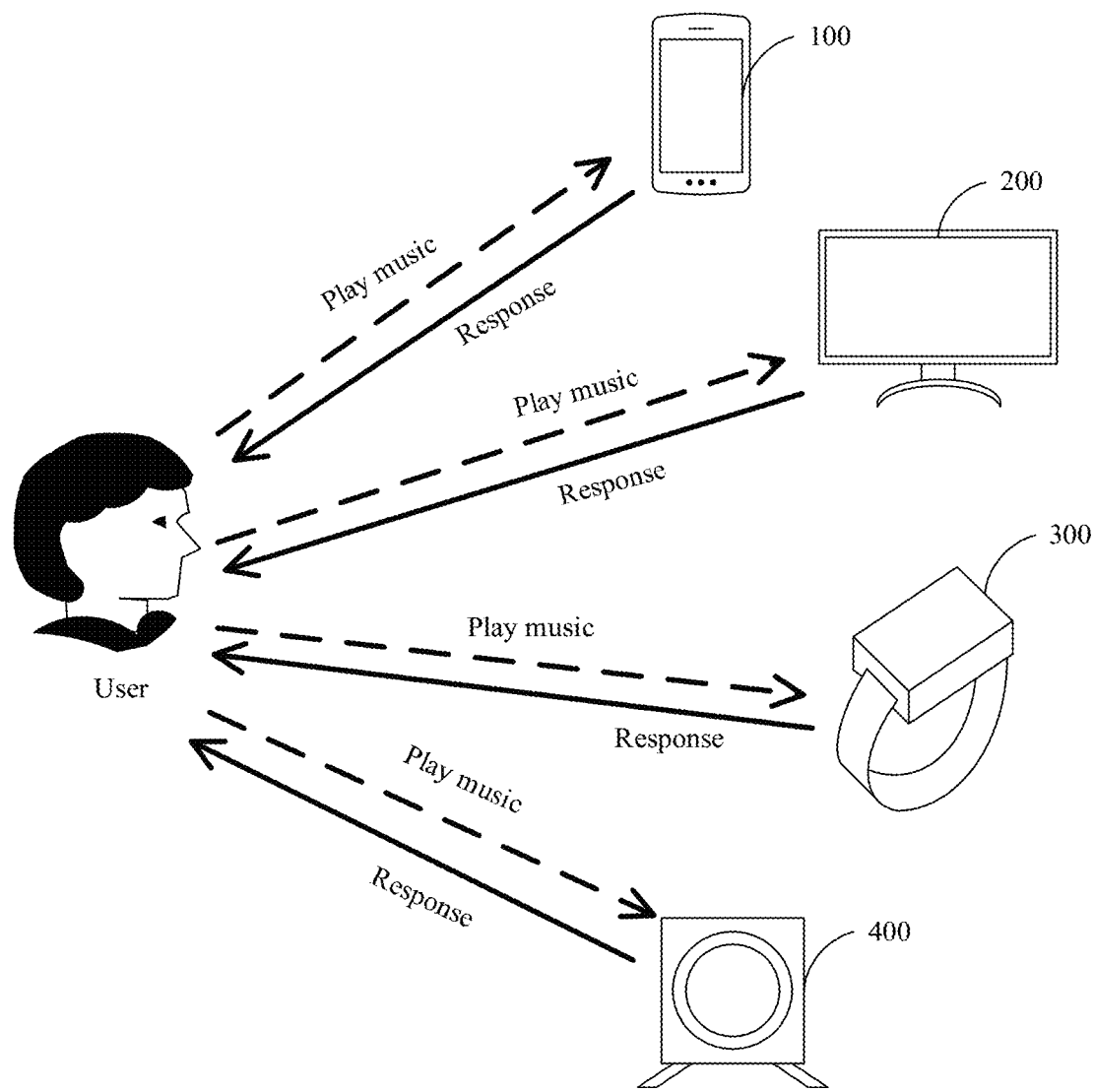
FIG. 19 is a schematic diagram of a voice instruction response scenario in the conventional technology.

For details, refer to FIG. 19. In a scenario shown in FIG. 19, a mobile phone 100, a smart television 200, a smart band 300, and a smart speaker 400 may all respond to a voice instruction said by the user. If the user directly sends a voice instruction "play music" without saying a wakeup word, the mobile phone 100, the smart television 200, the smart band 300, and the smart speaker 400 can all respond to the voice instruction and play music. In this way, a noisy environment is caused, and voice control experience is affected.

In this case, the foregoing solutions provided in the embodiments of this application may be used to implement a voice response. Each smart device may collect a sound signal, perform voice recognition on the sound signal, and determine, through a collaborative response, a response device of the voice instruction. In this way, only the responding device needs to respond to the voice instruction.

Figure 20:
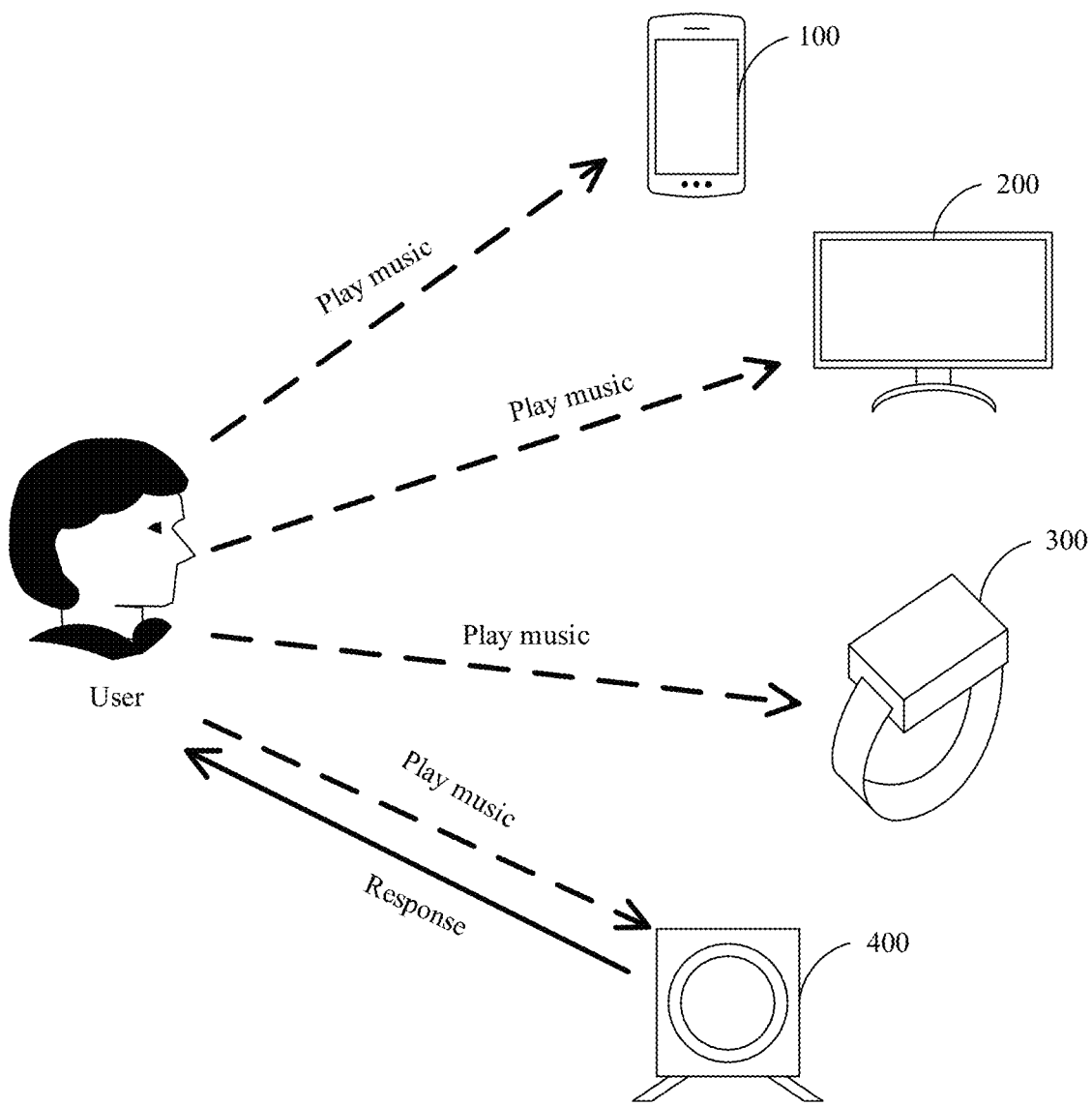
FIG. 20 is a schematic diagram of a voice instruction response scenario according to this application.

In this case, refer to FIG. 20. When the user says "play music", the mobile phone 100, the smart television 200, the smart band 300, and the smart speaker 400 may perform collaborative response in at least one manner shown in FIG. 9 to FIG. 18. In this way, it is determined that the smart speaker 400 is the response device of the voice instruction, the smart speaker 400 plays music, and the other smart devices do not respond.

The implementations of this application may be randomly combined to achieve different technical effects.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk), or the like.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

It is clear that a person skilled in the art can make various modifications and variations to the present invention without departing from the spirit and scope of the present invention. The present invention is intended to cover these modifications and variations of the present invention provided that they fall within the scope of the claims of the present invention and their equivalent technologies.

What is claimed is:

1. A method implemented by a first device, wherein the method comprising:
   when receiving a BLUETOOTH scanning enabling indication of a first application on a first device:
      receiving, from a second device, second broadcast data;
      sending, to the second device, a scanning request; and
      receiving, from the second device and in response to the scanning request, a scanning response; and
   in response to identifying the second broadcast data is a data packet of a first type:
      reporting the second broadcast data to the first application on the first device; and
      discarding the scanning response without reporting the scanning response to the first application.

2. The method of claim 1, further comprising:
   combining the second broadcast data with the scanning response to obtain combined data when the second broadcast data is not the data packet; and
   reporting the combined data to the first application.

3. The method of claim 1, further comprising receiving the BLUETOOTH scanning enabling indication after the first application collects a sound signal and when the first application is a voice assistant application.

4. The method of claim 3, wherein the second broadcast data is the data packet and carries collaboration information of the second device.

5. The method of claim 3, further comprising broadcasting first broadcast data after receiving the BLUETOOTH scanning enabling indication, wherein the first broadcast data carries collaboration information of the first device.

6. The method of claim 4, wherein the collaboration information indicates a response device of the sound signal, and wherein the collaboration information comprises at least one of a device type, a latest BLUETOOTH wakeup moment, a latest BLUETOOTH response moment, or a sound intensity of the sound signal.

7. The method of claim 6, further comprising further receiving the BLUETOOTH scanning enabling indication after the first application collects the sound signal and when recognizing that the sound signal is a wakeup word of the first device.

8. The method of claim 6, further comprising further receiving the BLUETOOTH scanning enabling indication after the first application collects the sound signal and before obtaining a voice recognition result.

9. The method of claim 5, wherein the collaboration information meets a preset response rule, and wherein the method further comprises:
   recognizing that the sound signal is not a wakeup word of the first device; and
   broadcasting, in response to recognizing that the sound signal is not the wakeup word, third broadcast data indicating that the sound signal is not the wakeup word.

10. The method of claim 1, further comprising:
    detecting that a BLUETOOTH option in the first device is turned on; and
    configuring, in response to detecting that the BLUETOOTH option in the first device is turned on, a first filter and a first scanning parameter for the first application.

11. An electronic device comprising:
    a memory configured to store instructions; and
    a processor coupled to the memory, wherein the instructions cause the processor to be configured to:
       when receiving a BLUETOOTH scanning enabling indication of a first application on the electronic device:
          receive, from a second device, second broadcast data;
          send, to the second device, a scanning request; and
          receive, from the second device and in response to the scanning request, a scanning response; and
       in response to identifying the second broadcast data is a data packet of a first type:
          report the second broadcast data to the first application on the electronic device; and
          discard the scanning response without reporting the scanning response to the first application.

12. The electronic device of claim 11, wherein the instructions cause the processor to be configured to:
    identify that the second broadcast data is not the data packet;
    combine, in response to identifying that the second broadcast data is not the data packet, the second broadcast data with the scanning response to obtain combined data; and
    report the combined data to the first application.

13. The electronic device of claim 11, wherein the instructions further cause the processor to be configured to further receive the BLUETOOTH scanning enabling indication after the first application collects a sound signal and when the first application is a voice assistant application.

14. The electronic device of claim 13, wherein the instructions further cause the processor to be configured to broadcast first broadcast data after receiving the BLUETOOTH scanning enabling indication, wherein the first broadcast data carries collaboration information of the electronic device.

15. The electronic device of claim 14, wherein the collaboration information meets a preset response rule, and wherein the instructions further cause the processor to be configured to:
   recognize that the sound signal is not a wakeup word of the electronic device; and
   broadcast, in response to recognizing that the sound signal is not the wakeup word, third broadcast data indicating that the sound signal is not the wakeup word.

16. The electronic device of claim 13, wherein the second broadcast data carries collaboration information of the second device when the second broadcast data is the data packet.

17. The electronic device of claim 16, wherein the collaboration information determines indicates a response device of the sound signal, and wherein the collaboration information comprises at least one of a device type, a latest BLUETOOTH wakeup moment, a latest BLUETOOTH response moment, or a sound intensity of the sound signal.

18. The electronic device of claim 17, wherein the instructions further cause the processor to be configured to further receive the BLUETOOTH scanning enabling indication after the first application collects the sound signal and when recognizing that the sound signal is a wakeup word of the electronic device.

19. The electronic device of claim 17, wherein the instructions further cause the processor to be configured to further receive the BLUETOOTH scanning enabling indication after the first application collects the sound signal and before obtaining a voice recognition result.

20. A computer program product comprising computer-executable instructions that are stored on a non-transitory computer readable medium and that, when executed by a processor, cause an electronic device to:
   when receiving a BLUETOOTH scanning enabling indication of a first application on the electronic device:
      receive, from a second device, second broadcast data;
      send, to the second device, a scanning request; and
      receive, from the second device and in response to the scanning request, a scanning response; and
   in response to identifying the second broadcast data is a data packet of a first type:
      report the second broadcast data to the first application on the electronic device; and
      discard the scanning response without reporting the scanning response to the first application.

* * * * *

UNITED STATES PATENT AND TRADEMARK OFFICE
CERTIFICATE OF CORRECTION

| | | |
|---|---|---|
| PATENT NO. | : 12,133,283 B2 | Page 1 of 1 |
| APPLICATION NO. | : 17/761894 | |
| DATED | : October 29, 2024 | |
| INVENTOR(S) | : Zhongyin Jiang et al. | |

It is certified that error appears in the above-identified patent and that said Letters Patent is hereby corrected as shown below:

In the Claims

Claim 1, Column 35, Lines 38-39: "A method implemented by a first device, wherein the method comprising:" should read "A method comprising:"

Signed and Sealed this
Twenty-sixth Day of November, 2024

Katherine Kelly Vidal
*Director of the United States Patent and Trademark Office*